United States Patent [19]
Smutek et al.

[11] Patent Number: 5,526,445
[45] Date of Patent: Jun. 11, 1996

[54] SPOT FUNCTION ENDTONE NOISE AND GROWTH

[75] Inventors: John M. Smutek, Billerica; John B. Ford, Acton, both of Mass.

[73] Assignee: PrePRESS Solutions, Inc., East Hanover, N.J.

[21] Appl. No.: 110,354

[22] Filed: Aug. 23, 1993

[51] Int. Cl.$^6$ .............................. G06K 9/36; G06K 9/46
[52] U.S. Cl. .................. 382/237; 382/270; 358/457; 358/459
[58] Field of Search ............... 382/50, 270; 358/454, 358/455, 456, 457, 459

[56] References Cited

U.S. PATENT DOCUMENTS

| | | | |
|---|---|---|---|
| 4,916,545 | 4/1990 | Granger | 358/456 |
| 4,977,458 | 12/1990 | Granger et al. | 358/456 |
| 5,204,916 | 4/1993 | Hamilton et al. | 382/41 |
| 5,305,118 | 4/1994 | Schiller et al. | 358/456 |
| 5,307,181 | 4/1994 | Levien | 358/456 |

*Primary Examiner*—Leo H. Boudreau
*Assistant Examiner*—Phuoc Tran
*Attorney, Agent, or Firm*—Peter L. Michaelson

[57] ABSTRACT

A method of preventing Moire patterns in a halftone image includes creating a digital screen including a collection of cells having pixels with threshold values according to a spot function, and dithering the threshold values corresponding with the endtones while not dithering the midtone gray values. Preferably, the amount of dither increases with the difference between the threshold value of the pixels from the midtones. The growth of the spot due to increasing gray values is controlled such that all cells grow at the same rate at the endtone gray values, and some cells grow at different rates at the midtone gray values.

23 Claims, 14 Drawing Sheets

210

|    |    |    |    |    |    |    |    |    |     |
|----|----|----|----|----|----|----|----|----|-----|
| 99 | 94 | 82 | 67 | 59 | 60 | 68 | 84 | 96 | 100 |
| 93 | 87 | 74 | 55 | 39 | 40 | 59 | 76 | 88 | 95  |
| 81 | 73 | 52 | 30 | 23 | 24 | 32 | 57 | 75 | 83  |
| 64 | 50 | 29 | 15 | 10 | 12 | 16 | 31 | 56 | 67  |
| 48 | 36 | 20 | 8  | 3  | 4  | 11 | 22 | 38 | 55  |
| 47 | 35 | 19 | 6  | 1  | 2  | 9  | 21 | 37 | 53  |
| 63 | 45 | 26 | 13 | 5  | 7  | 14 | 28 | 51 | 65  |
| 78 | 70 | 44 | 25 | 17 | 18 | 27 | 49 | 72 | 80  |
| 90 | 85 | 69 | 43 | 33 | 34 | 47 | 71 | 86 | 92  |
| 97 | 89 | 77 | 61 | 41 | 43 | 63 | 79 | 91 | 98  |

|    |    |    |    |    |    |    |    |    |     |
|----|----|----|----|----|----|----|----|----|-----|
| 96 | 87 | 76 | 62 | 59 | 60 | 70 | 88 | 98 | 100 |
| 91 | 82 | 68 | 55 | 36 | 38 | 59 | 78 | 92 | 94  |
| 80 | 72 | 52 | 28 | 18 | 22 | 30 | 57 | 74 | 84  |
| 64 | 50 | 24 | 11 | 8  | 12 | 20 | 34 | 56 | 66  |
| 48 | 32 | 14 | 4  | 2  | 6  | 16 | 26 | 40 | 55  |
| 47 | 31 | 13 | 3  | 1  | 5  | 15 | 25 | 39 | 53  |
| 63 | 45 | 23 | 9  | 7  | 10 | 19 | 33 | 51 | 65  |
| 79 | 71 | 44 | 27 | 17 | 21 | 29 | 49 | 73 | 83  |
| 89 | 81 | 67 | 43 | 35 | 37 | 47 | 77 | 90 | 93  |
| 95 | 85 | 75 | 61 | 41 | 43 | 69 | 86 | 97 | 99  |

FIG. 8

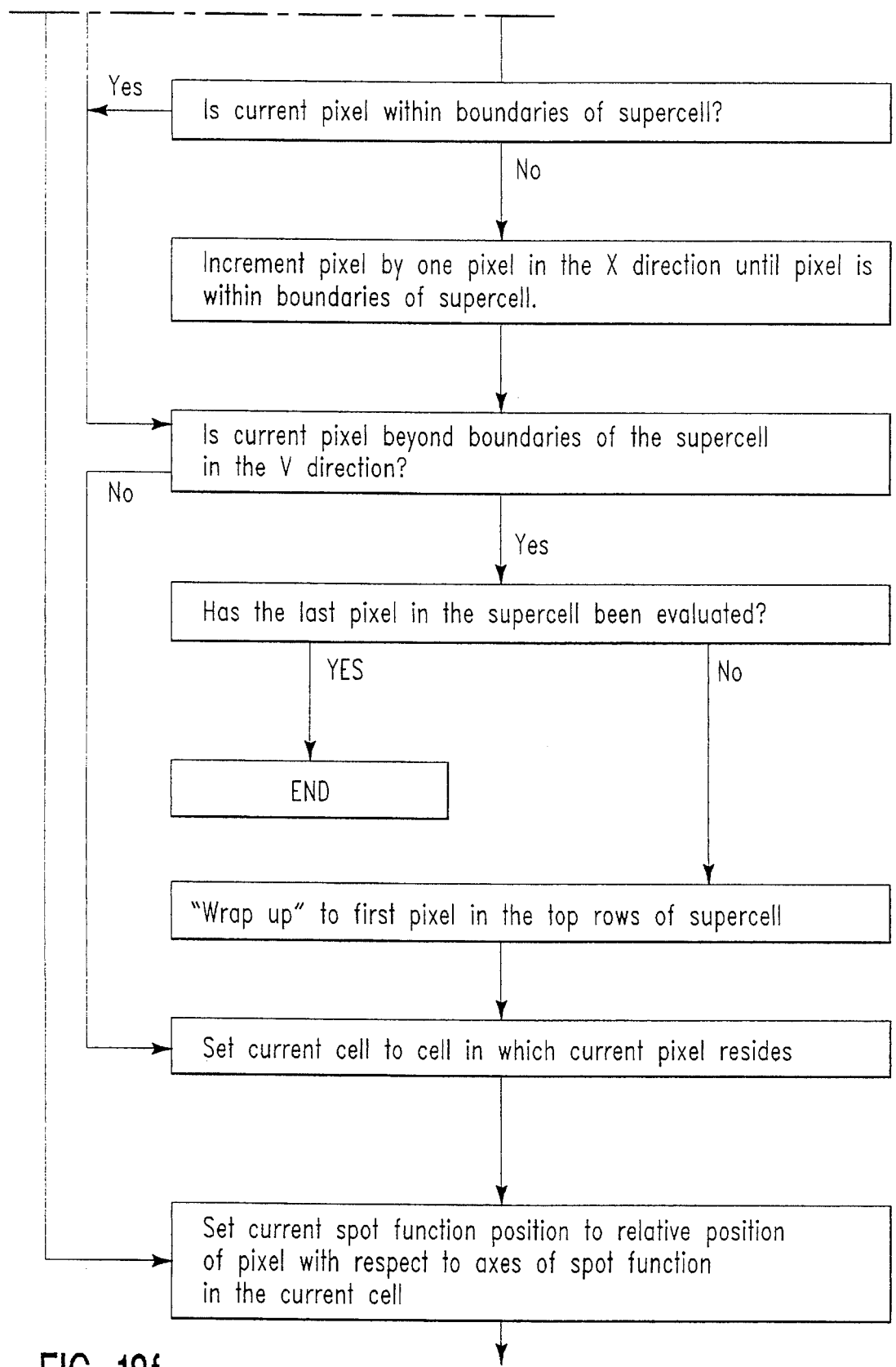
FIG. 18f  Go back to EVALUATE SPOT FUNCTION FOR PIXEL

SPOT FUNCTION ENDTONE NOISE AND GROWTH

BACKGROUND OF THE INVENTION

In order to facilitate the printing of images, it has long been desirable to convert an image having continuous tones ("the contone image") into an image having halftones. For example, a black & white picture is reproduced in a newspaper as a grid or array of black "spots", with the lighter areas having small spots and the darker areas having larger spots. For the very dark areas of a halftone image, the larger spots will run into one another so that the dark area looks like small white spots on a black field.

With the advent of computers, it is desirable for graphic artists to manipulate contone images and print them as halftone images. However, commercial computer printers and typesetters are incapable of printing individual halftone spots in an infinite number of sizes. Instead, each spot of a picture is in turn comprised of discrete smaller dots or "pixels". A pixel is generally the smallest mark a printer or typesetter can make, and, therefore, every spot will be collection of pixels.

FIG. 1 illustrates how one such spot may be made up of individual pixels. A grid 100 is comprised of a set of 100 contiguous pixels, and therefore, is capable of representing 101 shades of gray from totally light and white (0% gray and no pixels darkened) to totally dark and black (100% gray and all pixels darkened). For every 1% increase in darkness, one pixel will be darkened. For example, at 1% gray, a single pixel 1' is darkened. At 2% gray, pixel 2' is darkened as well, so that the spot is comprised of two pixels. At 10% gray, ten pixels 1'–10' are darkened. Pixels are either dark or not dark, and are not individually capable of representing shades of gray.

Rather than darkening a random pixel for every increase in gray level, it is preferable for the pixels to be darkened in a specific order pursuant to a "spot function". The order of darkening pixels in FIG. 1 reflects a spot function which attempts to maintain a generally circular shape as the spot increases in size. Topological curves (labeled from 10% to 100% in increments of 10%) generally define the outline of the spot as it increases in gray level. At 10% gray, the darkened pixels substantially conform with the 10% curve, and form a nearly circular spot around the center 110 of the spot function. At 20% gray, the darkened pixels form a slightly larger spot which substantially conforms with the 20% curve. At 50% gray, the pixels form a spot which is in substantially the shape of a diamond. At 90% gray, nearly all of the pixels are darkened except for 10 pixels 91'–100', these pixels being evenly dispersed at the four corners of the spot.

In the interest of speed, it is often desirable to store the pixels' representation of the spot function in memory for later use. To do so, the spot function is evaluated at the location of each pixel in the cell, the pixels are rank ordered according to their respective spot function values, and a threshold value from 0% to 100% is assigned to each pixel according to its rank. Where spot function values are identical for multiple pixels in a spot, their order can be determined by secondary considerations which may be arbitrary. In this way, each pixel has an associated "threshold value" which is equal to the gray level at which that pixel is darkened. FIG. 2. If a spot which represents a gray level of 75% is desired, the spot is created by darkening every pixel with a threshold value of 75% or less. A 75% gray level spot is indicated by outline 210. A single collection of pixels with threshold values representing a spot function is defined herein as a "halftone cell" or "cell". As defined herein, the terms "spot function" and "cell" are often interchangeable, as a cell is a quantized representation of a spot function, and the threshold values of the pixels map the spot function.

In this manner, a "digital screen" is created. A digital screen is an array of cells with pixels having threshold values. Each pixel has a set position and a set threshold value within the cell. Likewise, each cell has a set position within the digital screen. To create a halftone image, a contone image is broken down into an array of pixel-sized samples, and the gray level of each contone sample is stored. Next, each contone sample is compared with the threshold value of one pixel, and the pixel is darkened if the gray level of the contone sample is greater than the threshold value of the pixel. All the pixels of the digital screen are at set positions with respect to one another, such that a contone sample from the "top-left" of the picture would be compared with a pixel at the "top-left" of the digital screen. In other words, each digital screen pixel has a position which corresponds with and is associated with a position on the original contone picture.

FIG. 3 illustrates a halftone image represented by spots. FIG. 3 was created by comparing a picture having a consistent 5% gray value to a digital screen containing a 3-by-3 array of cells. Each cell contained 100 pixels, and only the pixels with threshold values of 5% or less were darkened. Accordingly, a 3-by-3 array of spots was created, each spot having five pixels. FIG. 4 was created by comparing a picture having a consistent 95% gray value to the same digital screen. All the pixels with gray values of 95% or less were darkened. Although the resulting halftone image is really comprised of nine large spots, the naked eye perceives the halftone image as being smaller white spots on a field of black.

Because a halftone image may be comprised of many thousands of spots, and because each spot is in turn comprised of many pixels, storing the values of a digital screen takes up a substantial amount of memory. Therefore, it is preferable to store a relatively small threshold array which may be replicated in two dimensions to "tile" a digital screen. These small arrays may consist of as little as a partial cell, or exactly one cell, or many cells grouped together. In many cases it is preferable to use arrays that consist of a large number of cells, which are often called "macrocells" or "supercells", because they offer the greatest flexibility for representing different screen frequencies and angles.

Unfortunately, the creation of supercells often produces undesirable side effects in the resulting halftone image, especially when a cell ideally includes a non-integer number of pixels. FIG. 5 illustrates a supercell which includes a 4-by-4 array of cells, each cell being associated with one spot function (the ideal boundaries of the cells are shown as solid lines). The supercell also includes a 25-by-25 array of pixels (the boundaries of the pixels are shown as short dashed lines). The ideal boundaries of the cells do not correspond exactly with the boundaries of the pixels. Instead, each cell is 6.25 pixels wide and 6.25 pixels high. Because of this non-integer relationship, a substantial amount of effort in the art has been devoted to methods which decide how a pixel which resides in two or more ideal cells is allocated to one cell or the other.

Aside from the border pixel difficulties, the quantization of non-integer ideal cells also creates difficulties at the endtones, i.e., those gray values close to 0% or 100% gray.

The problem is due to the fact that the center of the spot function will not correspond with the same pixel for each cell. The center 311 of the spot function of cell 310 is substantially centered within one pixel 301. Therefore, for cell 310, it is clear that pixel 301 should be the first pixel darkened in cell 310. However, it is not so clear which pixel should be the first pixel darkened for the other cells. Center 321 of cell 320 lies nearly at the border of four pixels 302–305. Accordingly, when the threshold values are allocated to the pixels of cell 320, the order of pixel darkening may be different for cell 320 than for cell 310. This quantization problem creates Moire patterns at the endtones.

FIG. 6 illustrates the Moire patterns created at the endtones when a contone image of about 6% is compared to the supercell of FIG. 5. Although each of the cells only darkens two pixels to make a spot, the orientation of the spots are different. For example, the four spots 501–504 in the lower-left quadrant of the halftone image are all horizontal, as are spots 505–508 in the top-right quadrant of the halftone image. The other spots, on the other hand, are all vertical. A predictable pattern of orientation is created at this light gray value, and the Moire pattern will be apparent and distracting to the naked eye. Even if the naked eye were not able to perceive the pattern across a single supercell, the pattern would become immediately apparent when the supercell is repeated across the entire digital screen and, consequently, the halftone image. A similar pattern might also be apparent at very dark gray values.

Consequently, there is a need for a method and system of creating digital screens which eliminate the visible Moire patterns at the endtones. One well known technique relies on the introduction of "noise". In a typical implementation of digital screening, the "noise" is in the form of a pseudo-random value of appropriate amplitude which is additively or multiplicatively combined with either the contone values of the image to be screened or with the threshold values in the digital screen. In this way the visibility of the Moire can be obscured but at the cost of introducing a "grainy" appearance due to the added noise. Therefore, there is still a need for a method and system of creating digital screens which prevent the creation of Moire patterns at the endtones.

In addition to the Moire patterns created by the quantization of an endtone spot, other Moire patterns may be created due to the rate at which the spots grow. As explained above, the average number of pixels per halftone cell may be nonintegral. Therefore, the actual number of pixels per cell varies. Since each spot must grow from 0% to 100% in response to a desired gray level, each spot must consequently grow at a different rate.

The different growth rates of spots may present Moire patterns. This is particularly troublesome in the endtones where the pixels of a cell are predominantly white or black and the difference in pixels added is proportionally large to the size of the spot. Furthermore, since the distribution of spot sizes within the supercell is regular across the printed halftone image, the artifacts can have a spatial period as large as the supercell. Since the spatial frequency will be low compared to the screen frequency, the artifacts are readily seen.

Consequently, there is a need for a method of growing a halftone spot which prevents the creation of Moire patterns.

The present invention provides methods to meet those needs.

SUMMARY OF THE INVENTION

The present invention provides a method of providing pixel threshold values for a plurality of pixels. The method includes the step of assigning the pixels to cells so that each cell encompasses a set of a plurality of contiguous pixels.

The method also includes applying a spot function to the pixels within each cell so that the spot function assigns a threshold value to each pixel depending upon the position of the pixel within the cell. The spot function will produce a mapping of threshold values to pixel locations, all of the threshold values falling between a minimum threshold value and a maximum threshold value. The threshold values for the pixels include low endtone values close to the minimum value, midtone values substantially midway between the minimum value and the maximum value, and high endtone values close to the maximum value.

The method further includes applying an endtone-dithering variation in the mapping of threshold values to pixel locations so that the mapping varies from cell to cell. The endtone-dithering variation causes at least some pixel locations assigned endtone values in some cells to be assigned different endtone values in other cells, the endtone-dithering variation not causing pixel locations assigned the midtone values to receive different values from cell to cell.

Preferably, the spot function assigns midtone values to pixel locations along a midtone locus, and the step of applying an endtone-dithering variation introduces relatively great variation in the values assigned to pixel locations remote from the midtone locus and relatively small variation in the values assigned to pixel locations close to the midtone locus.

Desirably, the cells are separated by boundaries therebetween. The spot function of each cell assigns midtone values to pixel locations along a midtone locus in the form of a substantially closed loop surrounding a central region of the cell so that each cell has corner regions outside of the loop which border the corner regions of adjacent cells. The step of applying endtone variations is performed so that the threshold values for pixel locations within mutually bordering corner regions are substantially continuous with one another. Yet further, the step of applying endtone variations preferably includes the step of applying the spot function according to a continuous function of location within each set of mutually bordering corner regions.

Desirably, the spot function has an argument including location within a cell and one or more noise components which are functions of one or more noise values and location within the cell. One or more of the noise values are the same within the central region of each cell but different for the central regions of different cells. Further, one or more noise values are the same for each set of mutually bordering corner regions but different for different sets of corner regions.

Preferably, the threshold value of each pixel is equal to $f[u+noise_u*(abs(abs(u)+abs(v)-1)), v+noise_v*(abs(abs(u)+abs(v)-1))]$, where: u and v represent the location of the pixel between −1 and 1; $noise_u$ and $noise_v$ are noise components equal to the magnitude of the noise in the u and v directions, respectively; and f[] is a function. Desirably, f[u,v] equals cos u+cos v such that the threshold value of each pixel is proportional to $cos(u+noise_u*(abs(abs(u)+abs(v)-1)))+cos(v+noise_v*(abs(abs(u)+abs(v)-1)))$.

It is further preferred that the noise values be different for most of the cells. One of the noise values may be a noise magnitude which corresponds with the distance between the pixel location having a threshold value closest to the minimum threshold value before the application of the endtone-dithering and the pixel location having the threshold value closest to the minimum threshold value after the application of the endtone-dithering. Also, one of the noise values may be a noise direction which corresponds with the difference in location between the pixel location of the pixel having the threshold value closest to the minimum threshold value before the application of the endtone-dithering and the pixel location of the pixel having the threshold value closest to the minimum threshold value after the application of the endtone-dithering. When the pixel location of the pixel having a threshold value closest to the minimum threshold value before the application of the endtone-dithering is an origin location and the pixel location of the pixel having a threshold value closest to the minimum threshold value after the application of the endtone-dithering is a center location, the threshold values of the pixels at pixel locations away from the center location in the noise direction preferably decrease after the application of the endtone-dithering. Further, the threshold values of the pixels at pixel locations away from the origin location in the direction opposite to the noise direction preferably increase after the application of the endtone-dithering.

It is also desirable for the midtone loci of the cells to intersect one another at borders between cells so that the intersecting midtone loci separate sets of mutually bordering corner regions from one another.

The method may also include scaling the threshold values after the step of applying an endtone-dithering variation such that each threshold value is an integer gray level.

Preferably, the method also comprises providing an input picture signal having signal values associated with different locations of an input picture, comparing the input picture signal to the pixels of the cells, and printing a pixel at a pixel location if the magnitude of the input signal associated with such pixel location is greater than the threshold value of the pixel.

Alternatively, the method further comprises providing an input picture signal having signal values associated with different input picture locations, the input picture locations being associated with the pixel locations, generating a plurality of cells with endtone dithering variations and grouping the cells together into a tiling supercell, comparing a signal value of the input picture signal with the threshold value of the pixel at the associated pixel location, printing the pixel if the magnitude of the signal value is greater than the threshold value of the pixel, and comparing the threshold value of the same pixel location with the signal value at yet another input picture location.

In another preferred embodiment of the present invention, a digital halftone screen for comparison to an input picture signal comprises halftone spots having and origin and a set of pixels. Each pixel is a distance u from the origin in a horizontal direction and a distance v from the origin in a vertical direction such that both u and v are between −1 and 1. Each pixel has a threshold value for comparison to the input picture signal, the threshold values being within a minimum and maximum value. The halftone spots include noise in the horizontal and vertical directions with values equal to $noise_u$ and $noise_v$, respectively, such that the threshold value for each pixel is $f[u+noise_u*(abs(abs(u)+abs(v)-1)), v+noise_v*(abs(abs(u)+abs(v)-1))]$ where $f[]$ is a function of u and v.

Preferably, the threshold value for each pixel is proportional to $cos(u+noise_u*(abs(abs(u)+abs(v)-1)))+cos(v+noise_v*(abs(abs(u)+abs(v)-1)))$.

In yet another aspect of the present invention, a method of providing pixel threshold values for a plurality of pixels comprises the step of assigning pixels to cells so that each cell encompasses a plurality of contiguous pixels and so that at least some of the cells have differing numbers of pixels. Also, a threshold value of gray level is assigned to each pixel within the cell so that a pixel will be darkened when a gray level exceeds the threshold value for that pixel such that the number of darkened pixels in the cell increases as the gray level is increased from a minimum to a maximum. Further, the method comprises providing a growth variation in the threshold values of the pixels so that for gray levels in a midtone range approximately midway between the minimum and the maximum, the increase in the number of pixels darkened for a given increase in gray level is different for some cells than for other cells, but in an endtone range close to the minimum and close to the maximum, the increase in the number of pixels darkened for a given increase in gray level is the same for all of the cells.

Desirably, the increase in the number of pixels for gray levels in the midtone range is greater for cells having more pixels than the average number of pixels per cell, and is less for cells having less pixels than the average number of pixels per cell.

The method preferably further comprises providing an input picture signal having gray values representing a picture, and darkening the pixels when the threshold value of a pixel is less than the gray value of the input picture signal. In addition, where the total number of gray values is equal to the number of possible gray values, the increase in pixels in the endtone range is preferably equal to the integral portion of the average number of pixels per cell divided by the total number of gray values. Yet further, the increase in pixels in the midtone range is desirably a multiple of the increase in pixels in the endtone range. The increase in pixels in the midtone range is preferably twice the increase in pixels in the endtone range if the number of pixels in the cell is greater than or equal to the average number of pixels per cell, and the increase in pixels in the midtone range is preferably zero if the number of pixels in the cell is less than the average number of pixels per cell.

The change in increase in the number of pixels may change at transition points from the increase associated with the endtone range to the increase associated with the midtone range, with the transition points being dependant upon the numbers of pixels within the cells. More specifically, the transition points occur after $n^2-(N^2)/2$ pixels have been added and after $3*(N^2)/2-n^2$ pixels have been added when $N^2>=n^2$; and after $(N^2)/2$ pixels have been added and after $n^2-(N^2)/2$ pixels have been added when $N^2<n^2$; where $N^2$ equals the number of pixels in the cell, $n^2$ equals the average number of pixels per cell for all cells.

DESCRIPTION OF THE DRAWINGS

FIG. 2 is a representation of the threshold values of pixels of a cell.

FIG. 8 is a representation of the threshold values of pixels according to a preferred embodiment of the present invention.

DETAILED DESCRIPTION OF THE PREFERRED EMBODIMENTS

Figure 7:
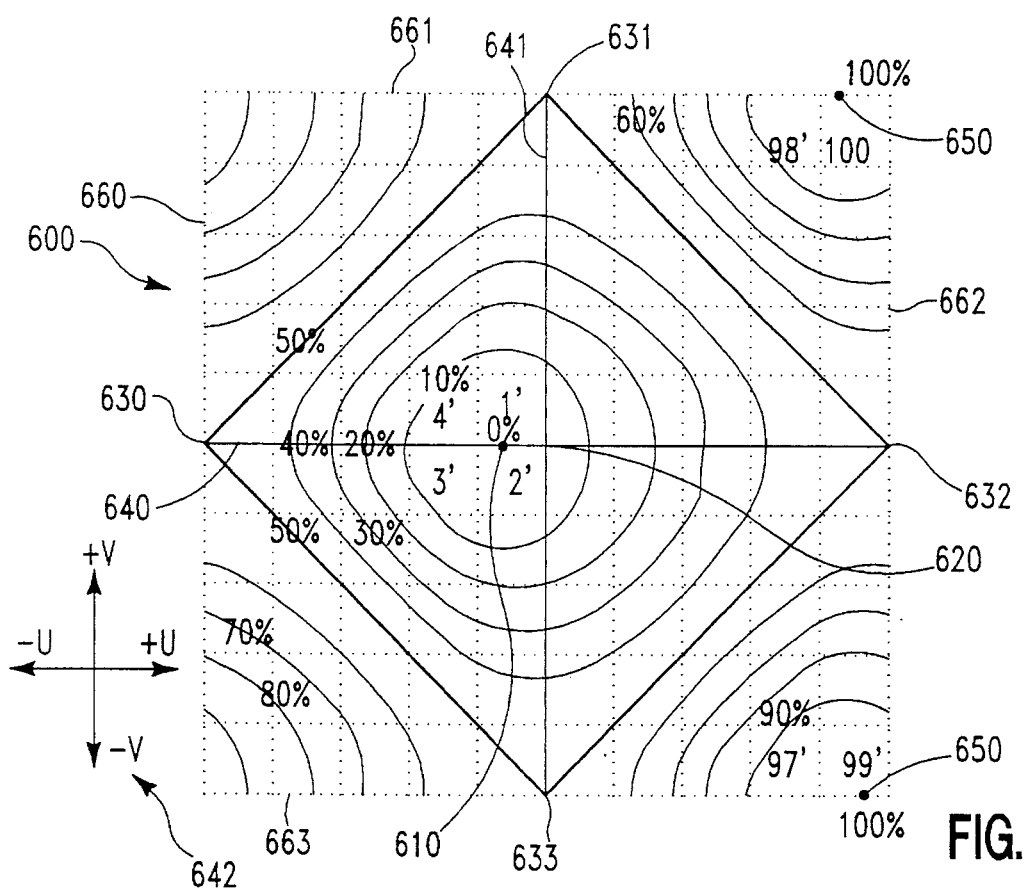
FIG. 7 is a representation of a cell and spot function according to a preferred embodiment of the present invention.

FIG. 7 is a topological view of a spot function dithered with endtone noise in accordance with the present invention. As with FIG. 1, the various curves define the outer edges of a spot at different gray levels. For example, the 10% curve defines the shape of the spot when all the contone values corresponding with the spot are 10% gray, i.e., a very light area. As the gray level increases, the spot gradually grows to a diamond shape at the midtones, as defined by the 50% curve. As the gray level approaches black, nearly the entire cell is darkened. The exact 0% value of the spot function is defined herein as the "center" of the spot function, and is identified by the point 610.

The spot function is disposed about a U axis 640 and V axis 641. The U and V axis intersect at a right angle at origin 620. For ease of reference, all directions which are parallel to the U axis 640 and which travel to the right shall be referred to as "positive U directions". All directions which are parallel to the U axis 640 and which travel to the left and opposite the positive U direction shall be referred to as "negative U directions". All directions which are parallel to the V axis 641 and which travel upwards shall be referred to as "positive V directions". All directions which are parallel to the V axis 641 and which travel downwards and opposite the positive V direction shall be referred to as "negative V directions". Compass 642 illustrates the directions.

The borders of the cells are parallel or perpendicular to the U axis. Cell borders 660, 661, 662, and 663 define the left, top, right, and bottom boundaries of the cell 600, respectively. The cell borders align exactly with the borders of the pixels. Accordingly, cell 600 contains an integer number of pixels.

Figure 1:
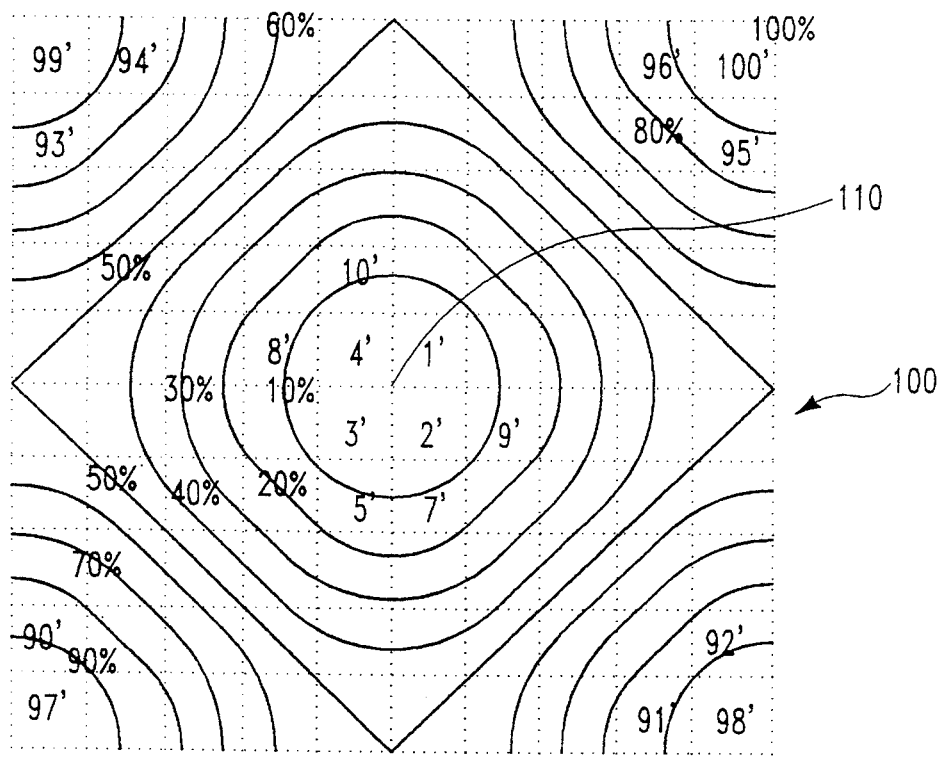
FIG. 1 is a representation of a cell and a spot function.
Figure 5:
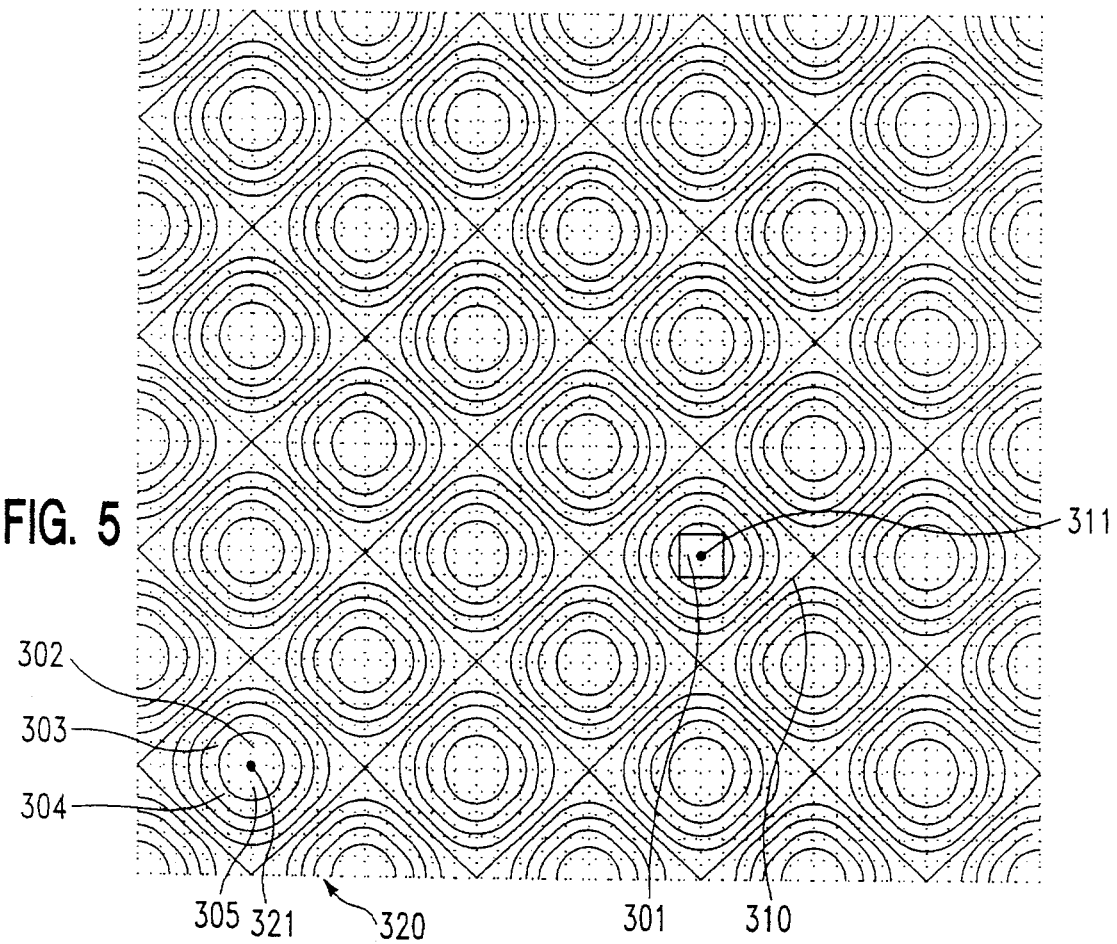
FIG. 5 is a representation of a supercell and spot functions.
Figure 3:
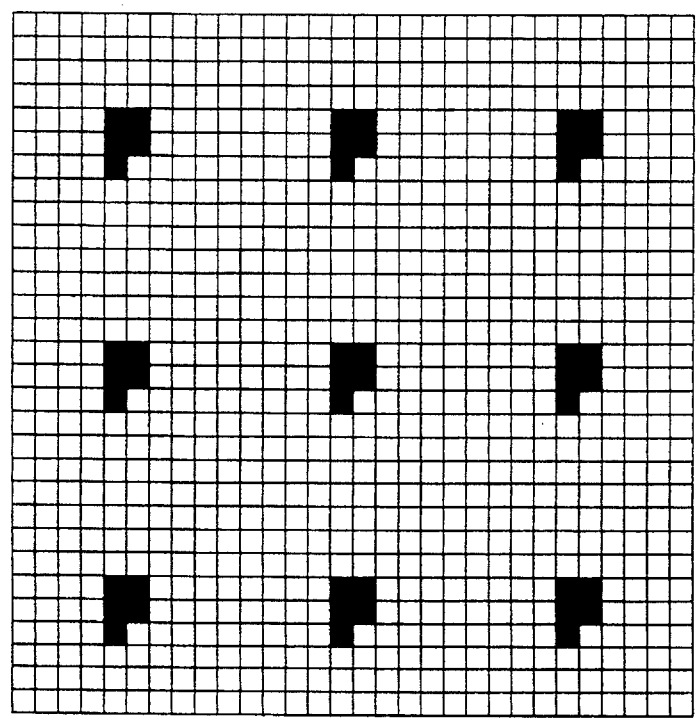
FIG. 3 is a halftone image.
Figure 4:
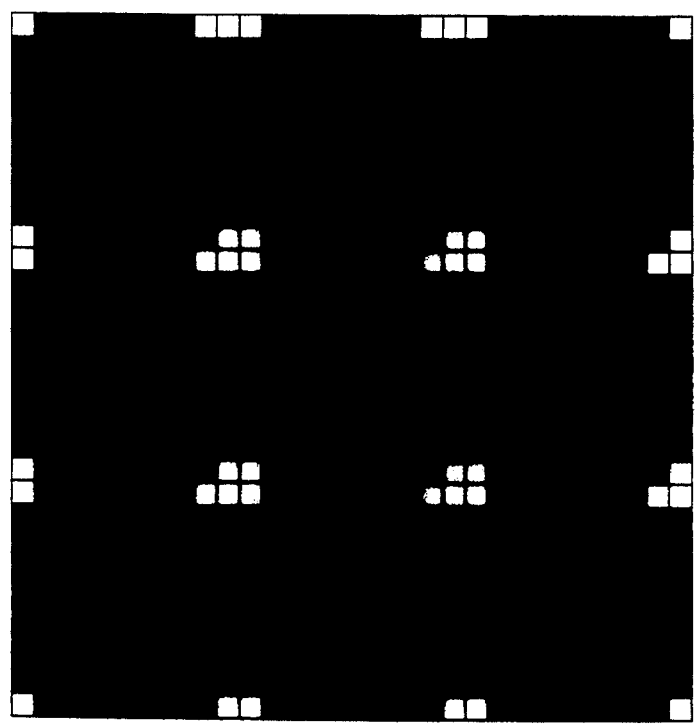
FIG. 4 is a halftone image.

While the spot function may change from cell to cell, the origin and axes of the cells are defined with respect to the boundaries of the cells and are congruent from cell to cell. The position of the origin of the spot function of FIG. 1 is the same with the boundaries of that cell as the position of the origin 620 of the cell with respect to the boundaries of cell 600. In other words, if cell 100 were overlaid on top of cell 600, the boundaries, axes, and origins would correspond exactly. However, the spot function with respect to those boundaries, axes, and origins would be different.

Noise has been added to the spot function of cell 600 to offset the center 610 from the origin 620. Specifically, the center 610 of the spot function is disposed about 0.75 pixels from origin 620 in the negative U direction. Put another way, the endtone noise associated with cell 600 has a magnitude of 0.75 pixels at a direction of 180°, the angle being measured with respect to the positive U-axis 640.

If a contone signal with a consistent 4% gray level was compared to every pixel of the spot function 600, only the four pixels 01', 02', 03' and 04' closest to center 610 would be darkened, and a small dot would appear slightly offset from the origin 620. If the spot function had no endtone noise, the four pixels immediately surrounding the origin would have been darkened.

The 100% gray level (black) point of the spot function also experiences the same offset as the center of the spot function. The 100% black point 650 is now 0.75 pixels in the negative U direction from border 662. Before, in FIG. 1, the 100% gray level point occurred precisely at the outer four corners of the cell. With the introduction of noise, the 100% gray level point has shifted with a magnitude and direction equivalent to the shift experienced by the 0% gray level center 610. If a contone signal with a consistent 96% gray level was compared to every pixel of spot function 600, the four pixels 97'–100' would remain undarkened while every other pixel was darkened. If the spot function had no endtone noise, one pixel at each of the four corners of the cell would have remained undarkened.

The midtones, on the other hand, have experienced no offset with respect to the origin. The curves defining the 50% gray level still extend diagonally from the intersection 630 of the U-axis 640 and left cell border 660, to the top 631 of the V-axis 641 and top cell border 661, to the intersection 632 of the U-axis 640 and right cell border 662, to the intersection 633 of the V-axis 641 and bottom cell border 663, and finally back to the intersection point 630. The position of the pixels which had a threshold value substantially equal to 50% in the reference spot function 100 without noise (FIG. 1) have not changed in the spot function 600 experiencing endtone noise (FIG. 7). For example, the pixel 50' corresponding with a 50% gray threshold value is in the same position in FIG. 1 with respect to the origin as it is in FIG. 7.

For the position of the pixels having threshold values between the midtones and the endtones, the offset is still in the same direction as the noise direction, but the magnitude of the offset depends on the distance of the pixel from the diagonal lines joining the midpoints of the edges of the spot function. These diagonal lines represent the 50% gray values of the spot function and, therefore, the offset of the pixels will vary with the pixels' distance from the pixels representing the midtones. The closer a pixel is located to the 50% gray lines, the less the topological curve defining the gray value of the pixel will change in the presence of noise. Although the 10% curve of FIG. 7 is substantially offset from the origin compared to the reference spot function 100 of FIG. 1, the 40% curve is only slightly offset from the origin compared to its reference position.

FIG. 8 shows the threshold values of pixels which map the spot function of FIG. 7. The pixels 1–4 which represent a 4% gray level are all to the left of the origin in the negative U direction. Before, without noise, the pixels would have surrounded the origin. On the other hand, the pixels which were associated with 50% gray values before noise was introduced are the same pixels which are associated with 50% gray values after noise is introduced.

Figure 6:
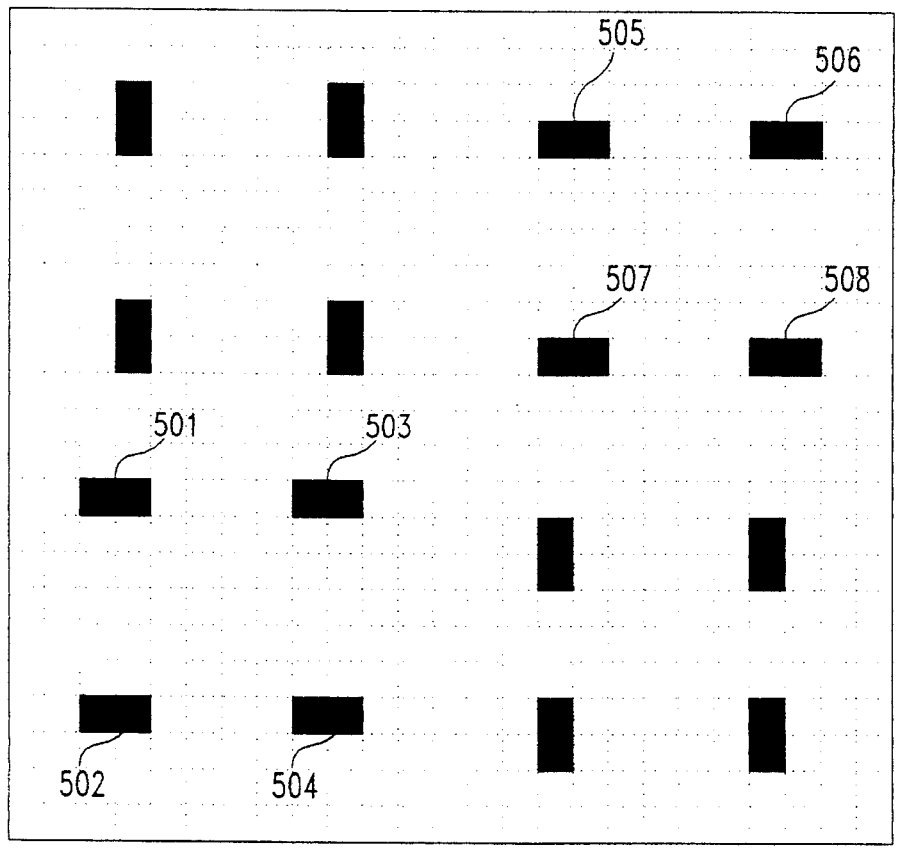
FIG. 6 is a halftone image.
Figure 9:
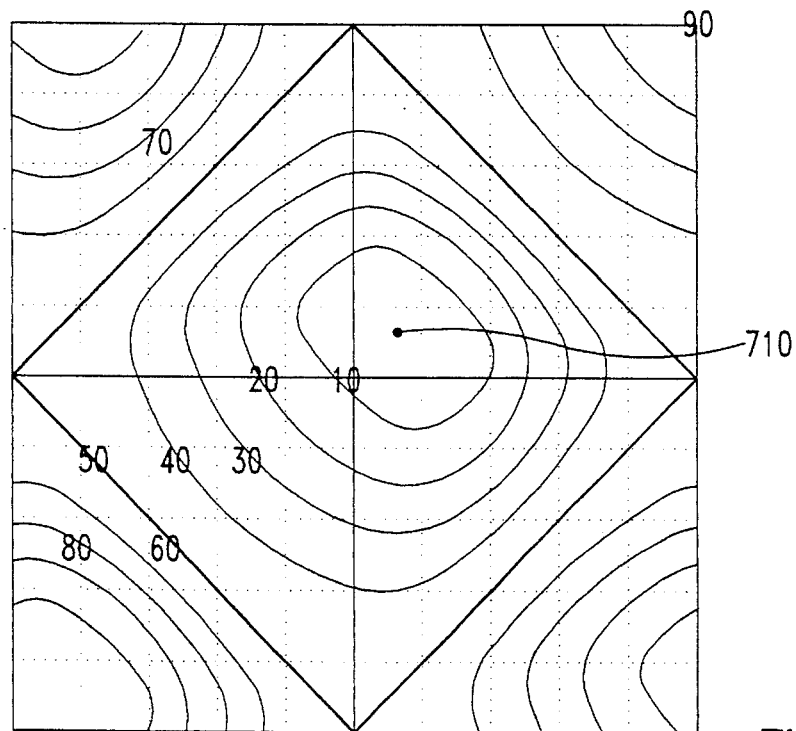
FIG. 9 is a representation of a cell and spot function according to another preferred embodiment of the present invention.

As another example, FIG. 9 illustrates a spot function which has been offset in both the U and V directions. The center 710 has been offset from the origin in the positive U direction by 0.75 pixels and by 0.75 pixels in the positive V direction. The 50% curves reflecting the midtones of the spot function are at the same position with respect to the origin as the 50% curves of the previous spot functions 100 and 600 (FIGS. 1 and 6).

A spot function includes pixels at fixed positions, with each pixel having a threshold value. The "noise" according to this aspect of the present invention is introduced into a spot function by changing the threshold values of the pixels associated with endtones and by not changing the threshold values of the pixels associated with midtones. The magnitude of the change for a particular pixel depends on the location of the pixel and its distance from the midtone pixels, such that the magnitude of the change generally increases with the difference between the threshold value and midtone values.

Not all of the threshold values of the pixels will correspond exactly with the general tendency of the offset to vary with distance from the midtones. Instead, because of the allocation of threshold values to pixels, some pixels will experience offsets much greater or less than pixels of nearly the same threshold value. For instance, the pixels 31 and 28 are equal distances from the midtone diagonals and origin. FIG. 2. After noise was introduced, the threshold value of pixel 31 experienced an increase to 34. FIG. 8. Similarly, pixel 28 experienced and increase to 33. While the location of pixels 31 and 28 were equidistant from the midtones, origin and center, they experienced different offsets. This is due to the vagaries of actually assigning integer and different values to each pixel. However, even though some pixels may change more or less than expected, the overall topological features of the spot function will behave in accordance with the present invention. In other words, although pixels 31 and 28 of FIG. 2 experienced different offsets, a mapping of the spot function from the threshold values still reveals the topological features shown in FIG. 7.

Figure 10:
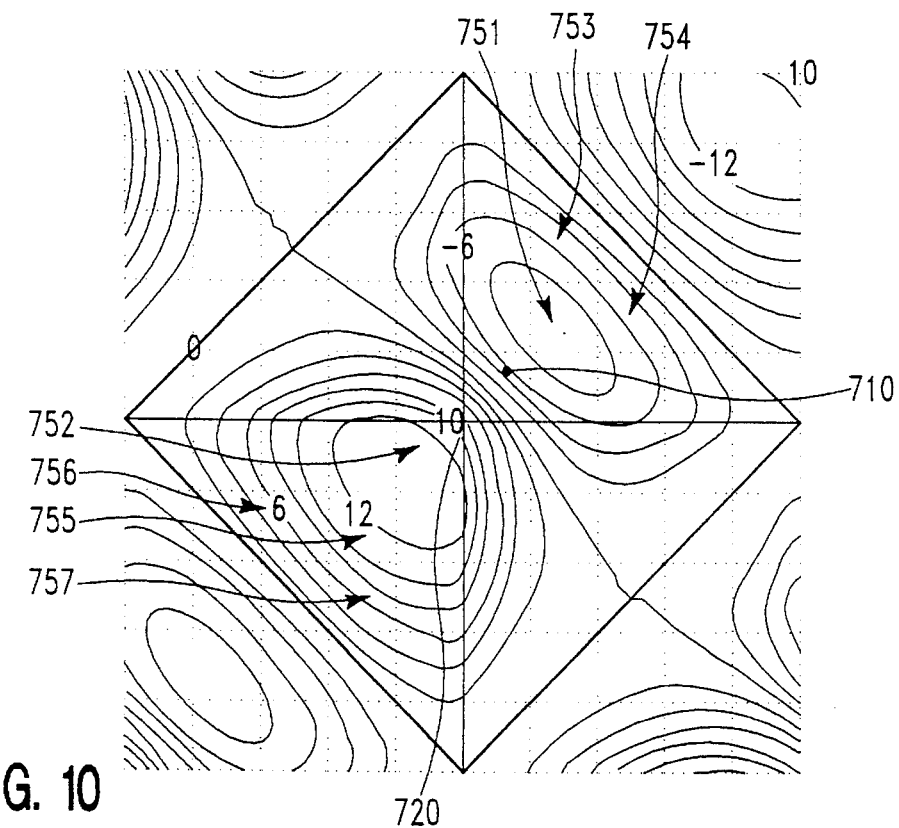
FIG. 10 is a representation of the difference between a spot function without noise and a spot function with noise according to another preferred embodiment of the present invention.

The topological curves of FIG. 10 illustrate the ideal difference in spot functions values of a spot function without noise (FIG. 1) and a spot function with noise (FIG. 9). The 0 curve indicates where no change has occurred in the threshold values of the pixels in spite of the introduction of noise. The 0 curve corresponds exactly with the midtones and indicates that the pixels along the 0 curve generally do not experience a change in threshold values with the introduction of noise. Towards the origin 720, however, a greater change in threshold value occurs. Pixel 751 is within the −12 curve, which means that the threshold value of pixel 751 will generally drop about 12 gray values when noise is introduced. Likewise, pixel 752 will generally experience an increase in threshold value of about 12 gray values when noise is introduced. From FIG. 10, it is noted that the greatest change in threshold values does not occur at the center 710 of the spot function with noise (FIG. 9), or at the origin 720 which is the center of the reference spot function (FIG. 1).

While the greatest change in threshold value does not occur at the center 710 of the spot function, the threshold values of the pixels between the center 710 (of the spot function with noise) and the midtones experience a drop in threshold value in a noise direction. For example, pixels 751, 753 and 754, which are disposed away from center 710 in the noise direction, all ideally experience a reduction in threshold value. Likewise, the threshold values of the pixels between the origin 720 (the center of the reference spot function) and the midtone values in the direction opposite the noise direction experience an increase in threshold value. For example, pixels 752 and 755–57 ideally experience an increase in threshold value when noise is added to the spot function.

ALGEBRAIC REPRESENTATION OF SPOT FUNCTION

For a spot function whose midtones are disposed on diagonals extending from and connecting with the intersection of the axes with the borders of the spot function, such as in FIGS. 1, 7, and 8, the spot function with noise may be represented algebraically as:

$$f[u+\text{noise}_U*||u|+|v|-1|, v+\text{noise}_V*||u|+|v|-1|]$$

where:
  f[] is a continuous function of u and v;
  u=distance of pixel from the origin in the u direction assuming the value of u is between 1 and −1;
  v=distance of pixel from the origin in the v direction assuming the value of v is between 1 and −1;
  $\text{noise}_U$=magnitude of noise of cell in the U direction; and
  $\text{noise}_V$=magnitude of noise of cell in the V direction.

In other words, noise is introduced to a function without noise, f[u,v], by offsetting the u and v parameters by a noise factor, f[u+(noise factor in the U direction), v+(noise factor in the V direction)]. Where f[u,v]=cos(u)+cos(v), such as in FIG. 1, the spot function with noise, such as in FIG. 6, is proportional to:

$$\cos(u+\text{noise}_U*||u|+|v|-1|)+\cos(v+\text{noise}_V*||u|+|v|-1|).$$

If $\text{noise}_U$ and $\text{noise}_V$ are both set to zero, then the spot function will equal cos (u+0)+cos (v+0), which is equivalent to a reference spot function without noise. In FIG. 7, $\text{noise}_U$=−0.75 pixels and $\text{noise}_V$=0 pixel, and in FIG. 8 $\text{noise}_U$=+0.75 pixels and $\text{noise}_V$=+0.75 pixels.

Therefore, for any pixel in any cell, the threshold value of a pixel may be individually determined by passing the spot function position of the pixel (U,V) to the equation, along with the noise of the cell ($\text{noise}_U$, $\text{noise}_V$).

Although $\text{noise}_U$ and $\text{noise}_V$ have both been expressed in Cartesian coordinates, the noise could also have been expressed in terms of magnitude and direction. The polar coordinates of magnitude ($\text{noise}_{mag}$) and direction (theta) are substituted for $\text{noise}_U$ and $\text{noise}_V$ as follows:

$$\text{noise}_U = \text{noise}_{mag} * \cos(\text{theta})$$

$$\text{noise}V = \text{noise}_{mag} * \sin(\text{theta})$$

where theta is measured with respect to the positive U axis.

Preferably, the spot function noise is scaled to be about one pixel in the U and V directions. A one pixel endtone dither is usually sufficient to randomize the position of the center of the spot with respect to the pixel boundaries, especially when the halftone cell is about 12 to 16 pixels across. For larger halftone cells, a larger dither is recommended just as a less than one pixel dither is recommended for smaller halftone cells.

SUPERCELLS OF THE PRESENT INVENTION

A. Position References

Figure 11:
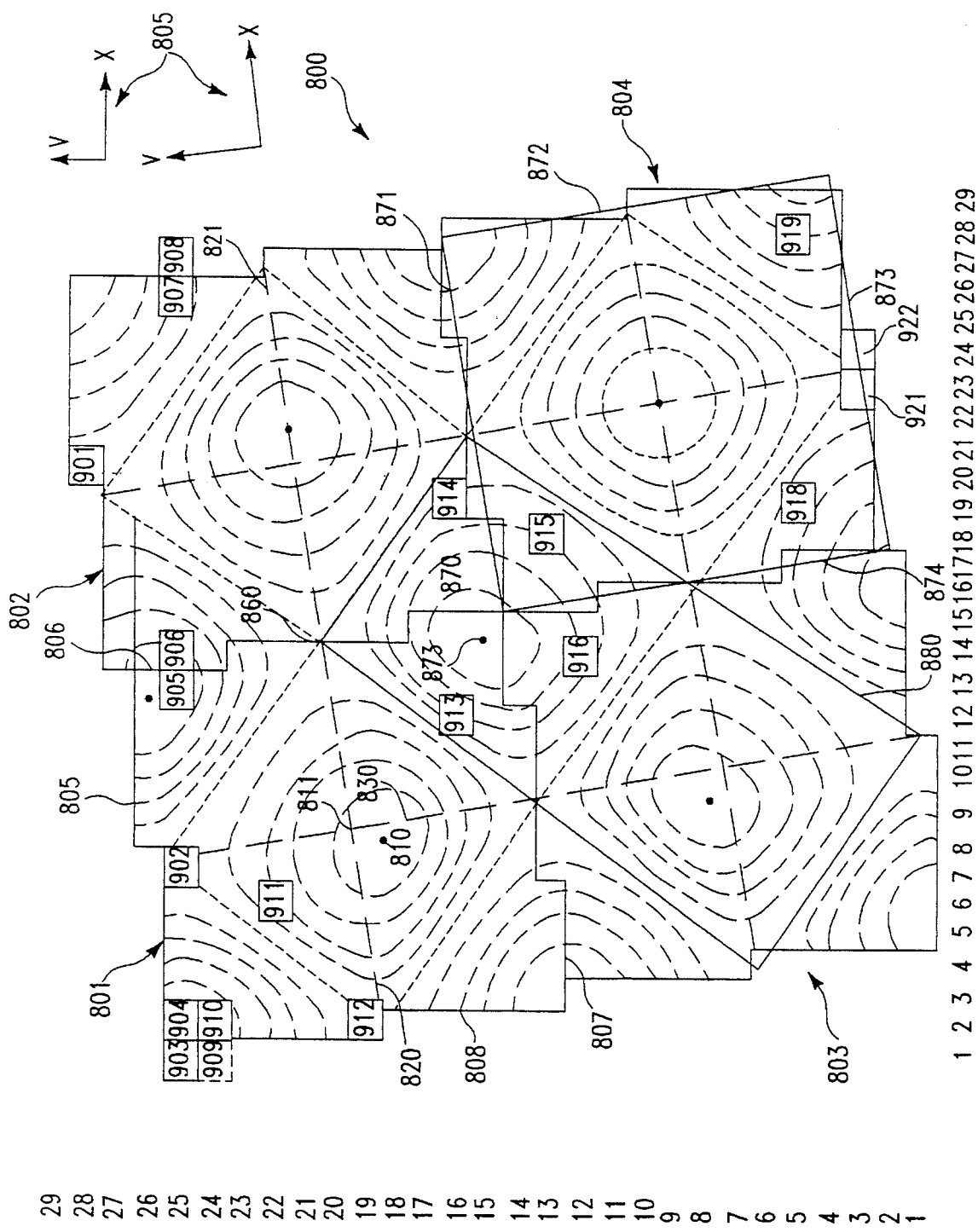
FIG. 11 is a representation of a supercell in accordance with yet another preferred embodiment of the present invention.

FIG. 11 shows a supercell 800, which includes four cells 801–804. Each cell bounds a given number of pixels. The pixels of cell 801 are within boundary lines 805–808. Ideally, the boundaries would be delimited by straight lines, such as lines 871–874 surrounding cell 804. Such an ideal cell would contain a non-integer number of pixels, namely 160.25. However, as pixels may only be wholly dark or wholly not dark, the boundaries of the cells are actually jagged lines which allocate entire pixels to either one cell or another.

The cells and supercell are rotated with respect to the typesetter axis. The "run" of the supercell is 25 pixels and the "rise" of the supercell is 4 pixels. Therefore, the angle of the supercell is arctan(4/25), i.e., about 9.09°. Because the cells are on an angle, it is convenient to refer to certain aspects of the cells with respect to their own axes of rotation, rather than expressing all values with respect to the axes of the typesetter. Thus, the X and Y axes correspond with the typesetter axes (and consequently the rows and columns of pixels), and the U and V axes correspond with the rotation of the supercell (and consequently with the rows and columns of cells). A compass 805 illustrates the relative directions of the U and V axes. The X and Y axis are also shown.

Each cell includes one spot function, with the spot function topologically illustrating the ideal threshold values of the pixels. The topological features of the spot function are shown as short dashed curves. The axes of the spot function are shown as long dashed lines, such as U axis 820 and V axis 830 of cell 801. It is noted that the U axis of one cell will meet the U axis of another cell at the boundary between the cells. U axis 820 of cell 801 meets U axis 821 of cell 802 at intersection point 860 on boundary line 806. Likewise, the V axes of the cells also intersect at the cell boundaries.

The center 810 of the spot function of cell 801 is shown as being offset from origin 811 by noise in accordance with the present invention. Because the 50% midtones of the various spot functions are not offset by endtone noise, the midtones of the cells maintain a fixed relationship with respect to the spot function axes no matter how much the center has been offset by noise. Therefore, the midtones of cell 801 will always meet the midtones of cell 802 at intersection point 860.

A single pixel may be defined by at least three different position parameters. First, the pixel has a position relative to the X and Y axes of the typesetter. For example, the (x,y) position of the pixel 911 is (6,22). Second, every pixel is within a cell, which itself has a position within the supercell. The positions of the cells are expressed with respect to the U and V axes of the supercell. The cell position of cell 801 is (1,1) (cell row 1, cell column 1), the cell position of cell 802 is (2,1), cell 803 is (1,2) and cell 804 is (2,2).

Third, each pixel has a position relative to the axes of the spot function of the individual cell. Knowing a pixel's position relative to the spot function is advantageous because a spot function equation is most easily expressed with respect to the rotated U and V axis of the spot function, not the X and Y axis of the typesetter. It is also convenient to define the spot function position in a scale other than pixels. By convention, the distance of a pixel from the origin of a supercell shall be expressed in spot function units or "sf-units". One sf-unit is equal to the distance between the origin 811 and the ideal boundary of the cell along the axes of the spot function. For example, pixel 902 at the intersection of the V axis with the top boundary 805 of cell 801 is about one sf-unit from the origin in the V direction. Its spot function position is actually about (0,0.9876) (0 sf-units in U direction, 0.9876 sf-units in the V direction), because a pixel's spot function position is measured from origin to the center of the pixel, and the center of pixel 902 is short distance from the upper boundary of the cell. Pixel 912 at the intersection of the U axis with the left boundary 808 of cell 801 is about one sf-unit from the origin in the negative U direction. Pixel 911 is spaced from the origin in the U and V directions, and has a spot function position of about (−0.27, 0.37).

B. Noise at Dark Threshold Values

Figure 12:
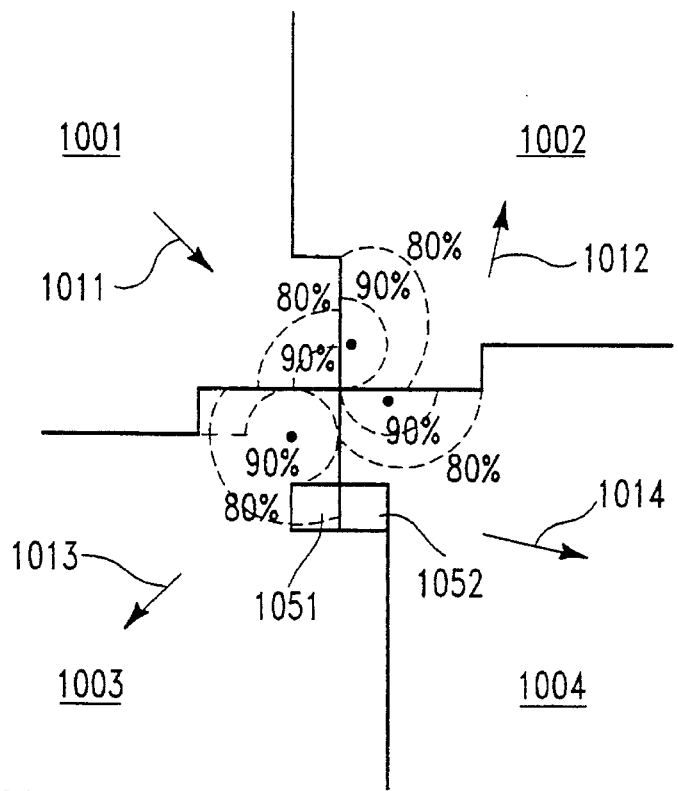
FIG. 12 is a representation of spot functions in accordance with yet a further embodiment of the present invention.

All four cells intersect at a point 870. Generally, the four pixels surrounding this point, one from each cell, will have a threshold value of nearly 100% gray, i.e., black. However, as the noise of the cells are randomly determined, the transition between the threshold values of the surrounding pixels may not be smooth. FIG. 12 shows the intersection of four cells 1001–04. All the cells 1001–04 have noise in directions indicated by arrows 1011–14, respectively. Cell 1001 has endtone noise which is offset about equally in the positive V and negative U directions. Cell 1002 has noise offset mostly in the positive V directions. Cell 1003 has noise in the negative U and negative V directions. Cell 1004 has noise mostly in the positive U direction. The magnitudes of the noise are also different from cell to cell.

Figure 13:
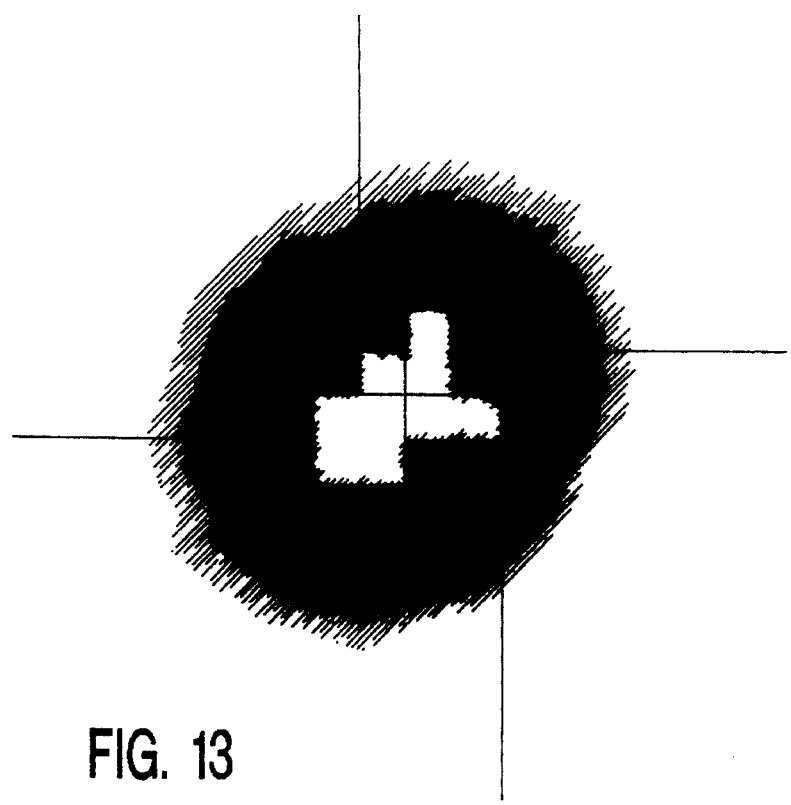
FIG. 13 is a halftone image in accordance with yet a further embodiment of the present invention.

Because all the cells have different noise directions and magnitudes, the spot function threshold values do not flow smoothly from one cell to the next. For example, pixel 1051 of cell 1003 will have a threshold value of about 85%, but neighboring pixel 1052 of cell 1004 will have a threshold value of only about 70%. If a contone picture having a relatively dark gray level of about 90% was compared to the pixels of the cells, a white shape with jagged edges or "artifacts" might appear (FIG. 13), rather than a smoother-looking white dot. Such artifacts have a substantial chance of being apparent to the naked eye, because two out-of-place pixels form a large portion of a nine-pixel white spot.

In order to prevent artifacts, it is preferable for the topological features of the threshold values to be continuous over adjacent cells. One manner of accomplishing this is to have the same noise applied to each of the endtone pixels closest to the intersection. In other words, the pixels which are outside of the midtone diagonals and thus at the corners of the cells will use the same noise as pixels in the mutually-bordering corners of other cells.

As shown in FIG. 11, the noise offset surrounding the intersection 870 of the four cells 801–804 is equal for all four cells, even though the centers of cells 801–804 are all offset in different noise directions by different magnitudes. When the dark tones are all offset equally at the intersection between the four cells, a "dark center" 873 appears. In this example, the noise offset for the dark tones is about 0.13 sf-units in the negative U direction and is about 0.11 sf-units in the negative V direction from the ideal intersection of the cells.

Preferably, the noise associated with the dark tones surrounding a cell intersection point is equal to the noise vector of one of the neighboring cells. For example, the noise at dark center 873 is equal to the noise vector of cell 803, which is to the lower left of the intersection point 870. By convention, all pixels which have threshold values in the darker tones, i.e. the pixels in the corners of the cells, will borrow their noise vector from the cell to the lower left of the intersection point, regardless of the noise of the cell in which the pixels actually reside. For example, the endtone noise associated with pixel 913 will be determined by the noise of cell 803 despite the fact that pixel 913 is in cell 801. Likewise the noise of cell 803 will apply to pixel 914 in cell 802, pixel 915 in cell 804, and pixel 916 in cell 803. This "borrowing" of noise from other cells allows the spots at the dark tones to grow consistently, without the artifacts associated with FIG. 12.

Rather than defining a cell as shown in FIG. 11 and "borrowing" noise vectors at dark tones, it is also possible to define a cell as a rectangle with two halves, all the pixels in one half having threshold values less than 50% and all the pixels in the other half of the cell having threshold values greater than 50%. The borders of the cells would be midtones. Box 880 shows the boundaries for such a cell. Using "rectangular cells" 880, noise would not have to be "borrowed" because all of the dark tone pixels are contained in the same rectangular cell as the lighter tones.

Under either manner of defining the halftone cells, the present invention is extremely advantageous in diminishing Moire. The application of noise at the endtones disturbs the patterns seen when spots of few pixels are quantized and tiled across an image. Whereas an image without endtone noise may create distracting effects, the present invention randomizes the endtones while preserving the gray levels of the image.

Halftone renditions of midtone images, on the other hand, do not experience offset or noise. Although a 50% gray image will be comprised of large diamond shaped spots, the intersection of these spots occurs at only one or two pixels. If the midtone ranges of two neighboring cells were randomly offset with different noise vectors, artifacts such as those shown in FIG. 12 would become apparent to the naked eye at the intersections of the midtones of differing cells. Therefore, it is preferable to "anchor" the midtones of the various cells with respect to each other.

The present invention diminishes Moire by randomizing endtone spot placement, preserving smooth endtone growth, and preventing the creation of artifacts at midtone intersections.

C. Method of Assigning Threshold Values to Pixels

An example of one method of creating a supercell embodying spot functions of the present invention is to travel the supercell from top to bottom, pixel by pixel, until threshold values have been assigned to every pixel of the supercell.

A set of data structures is created to hold the information necessary to traverse the supercell and assign threshold values. For ease of reference, the relevant parameters and variables are given short-hand names, which are defined as follows:

Total_Cells_In_Row: total number of cells in each row of the supercell. The rows of the supercell extend in the U direction, and in the case of FIG. 11, the value of Total_Cells_In_Row=2.

Total_Cells_In_Column: total number of cells in each column of the supercell. The columns of the supercell extend in the V direction, and in the case of FIG. 11, Total_Cells_In_Column=2.

Maximum_Noise_U, Maximum_Noise_V: the maximum amount of noise in the U and V direction that a cell may be dithered.

Current_Cell_U_Pos: the coordinate of the current cell in the U direction (measured from the left edge of the supercell).

Current_Cell_V_Pos: the coordinate of the current cell in the V direction (measured from the top edge of the supercell).

Current_Pixel_X_Pos: the coordinate of the current pixel in the X direction, as measured with respect to the axes of the typesetter.

Current_Pixel_Y_Pos: the coordinate of the current pixel in the Y direction, as measured with respect to the axis of the typesetter.

Current_Func_U_Pos: the coordinate of the current pixel in the U direction, as measured with respect to the axes and origin of the spot function within the current cell.

Current_Func_V_Pos: the coordinate of the current pixel in the V direction, as measured with respect to the axes and origin of the spot function within the current cell.

Noise_$U_N$, Noise_$V_N$: the magnitude of noise in the U and V directions of cell N.

Threshold_Value$_{x,y}$: the threshold value of the pixel whose coordinates are (x,y).

1. Precalculation of Noise

Figure 18A:
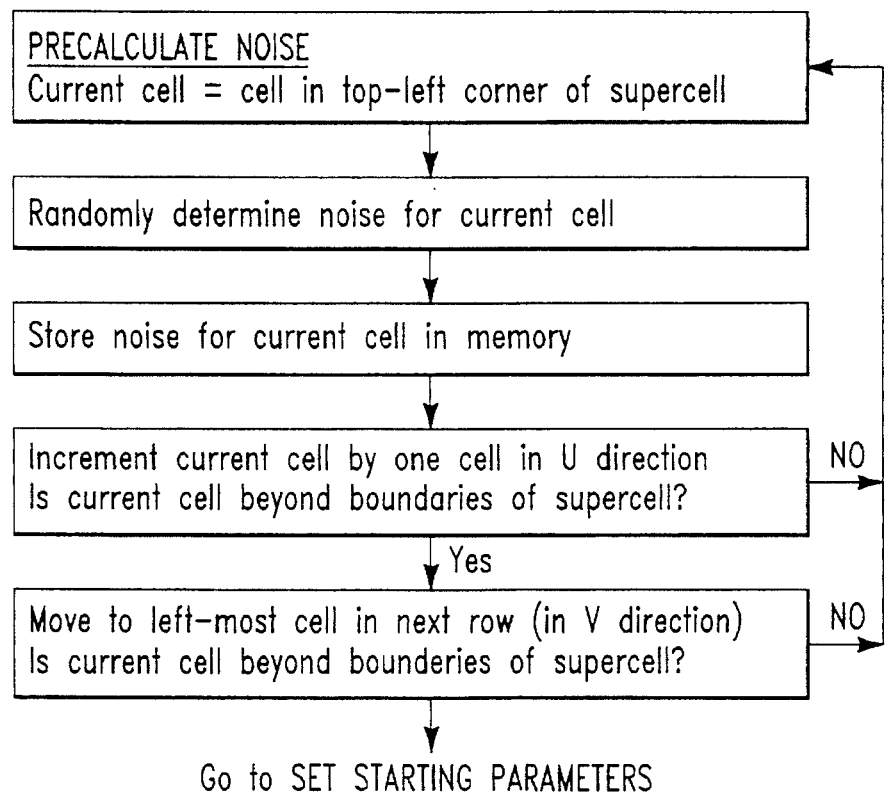
FIGS. 18(a)–18(f) collectively depict flowcharts of another aspect of the present invention.

After the data structures have been created, the noise of each cell in the supercell is precalculated and stored. As shown generally in FIG. 18(a), the first cell to have its noise calculated is the cell in the top-left corner of the supercell, i.e., cell 801 whose cell coordinates are (1,1). The noise vector is stored in Cartesian coordinates. First, the noise in the U direction is randomly determined and stored in Noise_$U_{(1,1)}$. Next, the cell's noise in the V direction is likewise randomly determined and stored in Noise_$V_{(1,1)}$. These values are retained for later use. The randomly determined noise values are numbers between −Max_Noise and Max_Noise. For a cell of more than 64 pixels, the preferable maximum noise displacement in either the U or V direction is ±1 pixel.

All the cells of the supercell are then traversed, and their respective noise values stored. One manner of traversing the supercell is to set aside variables which point to the current cell, and then change these variables to point to the next cell. For the first cell 801, Current_Cell_U_Pos is set to 1 and Current_Cell_V_Pos is set to 1 so that the "current cell" position indicators point to the top-left cell whose coordinates are (1,1). Once the noise for cell 801 is randomly determined and stored in Noise_$U_{(1,1)}$ and Noise_$V_{(1,1)}$, Current_Cell_U_Pos is incremented by one so that Current_Cell_U_Pos=2. Thus, the current cell will be (2,1), and the noise for cell 802 will be determined as described above.

After noise has been assigned to cell 802, Current_Cell_U_Pos is incremented, but its value will point to a cell whose U position is greater than the total cells in a row. For example, Current_Cell_U_Pos will equal 3, but Total_Cells_In_Row is only 2. Therefore, the first row of cells must be finished, so the second row of cells is begun at the left-most cell of the second row. Specifically, Current_Cell_U_Pos is reset to 1, and Current_Cell_V_Pos is incremented by one to 2. Noise is then assigned to cell 803, and the rest of the cells in the second row are assigned U and V noise values.

Because the noise for the cells is randomly determined, most of the cells will have different noise magnitudes and directions.

Eventually, the last cell 804 in the supercell will have noise assigned to it. Incrementing Current_Cell_V_Pos will indicate that the last row has been found because Current_Cell_V_Pos will be 3 and Total_Cells_In_Column will only be 2. Accordingly, the step of assigning noise to each cell will be complete.

2. Set Starting Parameters

Figure 18B:
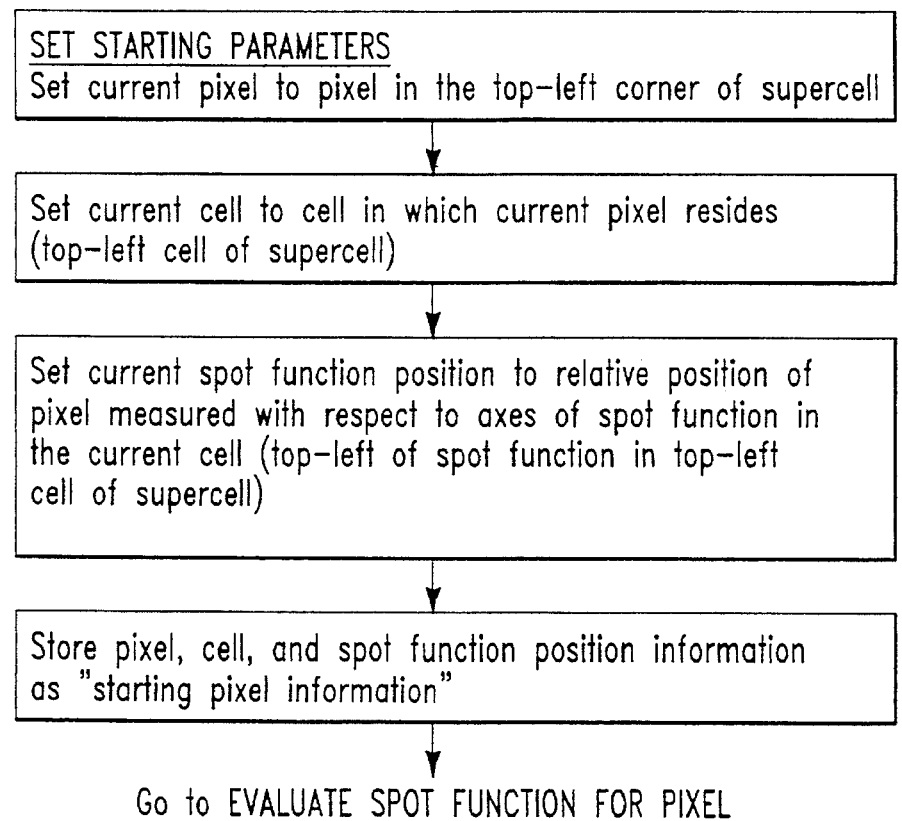

The next step is to assign threshold values to the individual pixels in the supercell. Preferably, the supercell is traversed pixel by pixel by starting at the top-left pixel, and then finishing an entire row of pixels before moving to the next row. Before the supercell is traversed, starting parameters are set. FIG. 18(b).

As shown in FIG. 11, the top left pixel is 903, and its typesetter coordinate (1,25). Therefore, Current_Pixel_X_Pos=1, and Current_Pixel_Y_Pos=25. As pixel 903 is in the top-left corner of the supercell, the current cell position is (1,1) such that Current_Cell_U_Pos=1 and Current_Cell_V_Pos=1.

The spot function position of the pixel relative to the axes of the spot function is (−1,1) because the center of the pixel is at the ideal top-left corner of the cell. Therefore, Current_Func_U_Pos=1 and Current_Func_V_Pos=1.

All of the above position information is also stored in memory under different variable names (referred to collectively as "starting pixel information") for later use, as described below.

3. Evaluate Threshold Value

Figure 18C:
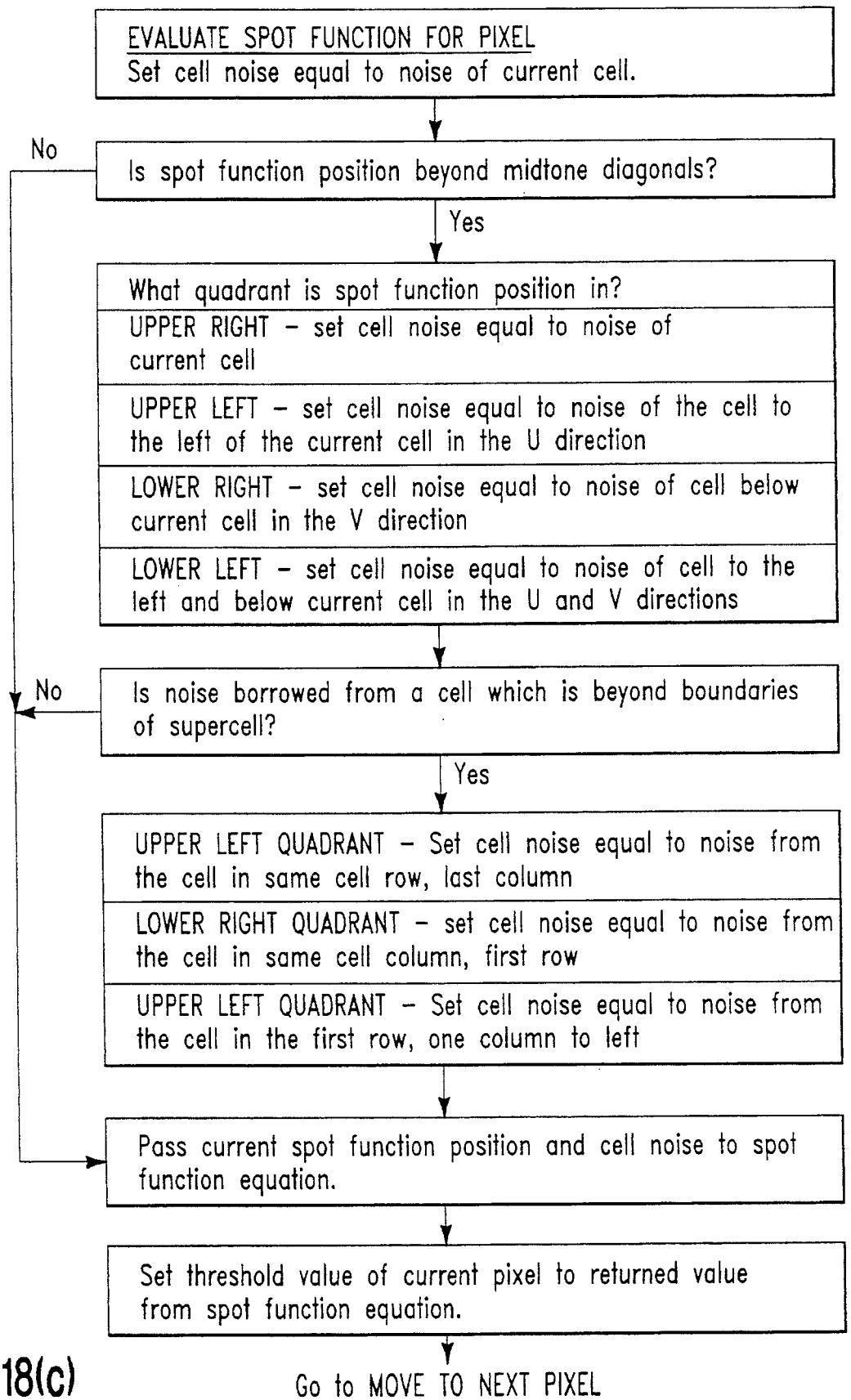

Before the spot function position can be passed to the spot function equation, the applicable noise must be determined. If the pixel is within the diagonals of the midtones, then the noise of the current cell will be used. If the pixel is associated with the darktones in the corners of the cell, then the applicable noise will most likely be "borrowed" from another cell, as explained above. One preferred method of evaluating threshold values is shown generally in FIG. 18(c).

To determine whether the pixel is a dark tone (greater than 50% gray), it is noted that all pixels with threshold values greater than 50% are beyond the 50% diagonals of the midtones. Therefore, if the position of any cell is such that the abs(Current_Func_U_Pos)+abs(Current_Func_V_Pos)>1, then the pixel is beyond the diagonals of the midtones.

The cell from which noise is taken for the pixel depends on the quadrant of the current pixel. If the current pixel is in the lower-right quadrant of the cell (Current_Func_U_Pos>0, Current_Func_V_Pos<0), then the noise is borrowed from the cell below the current cell. For pixel 913 in the lower-right quadrant of cell 801, the noise will be taken from cell 803 which is directly below cell 801. If the current pixel is in the lower-left quadrant of the current cell (Current_Func_U_Pos<0, Current_Func_V_Pos<0), then the applicable noise is borrowed from the cell immediately below and to the left of the current cell. If the current pixel is in the upper-left quadrant of the current cell (Current_Func_U_Pos<0, Current_Func_V_Pos>0), then the applicable noise is borrowed from the cell to the immediate left. If the current pixel is in the upper-right quadrant of the current cell (Current_Func_U_Pos>0, Current_Func_V_Pos>0), then the applicable noise is the noise of the current cell, i.e., no noise will be borrowed.

For cells on the edge of the supercell, it is occasionally necessary to "wrap around" the edges of the supercell to borrow the applicable noise. For a dark tone pixel in the upper-left quadrant of cell 801, the applicable noise for the pixel would have been taken from the cell to the immediate left of current cell 801. However, because there is no cell to the left of cell 801, the noise is taken from the cell 802 on the opposite side of the supercell in the same row. If the supercell were 5-by-5 cells wide, a dark tone pixel in the upper-left quadrant of the first cell in the first row would borrow the noise from the fifth and last cell in the first row. Likewise, if a cell is in the last row and a corner pixel must borrow noise from the cell below its current cell position, it will borrow the noise from a cell in the first row. For example, dark tone pixel 919 in the lower-right quadrant of cell 804 will borrow its noise from cell 802 which is in the top cell row in the same cell column. Pixel 918 in the lower-left quadrant of cell 804 will borrow its noise from cell 801 which is in the top cell row but one cell column to the left.

By way of illustration, the Current_Func_U_Pos of pixel 903 is −1, and the Current_Func_V_Pos of pixel 903 is 1. The sum of the absolute value of the spot function positions is determined to be abs(−1)+abs(1)=2, which is greater than one. Therefore, it is known that pixel 903 is outside the midtone diagonals of the cell, and the applicable noise must be found and borrowed from another cell. The quadrant in which pixel 903 resides is found by examining the sign of its U and V spot function position. Since Current_Func_U_Pos=−1 which is less than zero, and since Current_Func_V_Pos= 1 which is greater than zero, it is known that pixel 903 is in the upper-left quadrant, and noise must be borrowed from the cell to the left of the current cell 801. However, there is no cell to the left of cell 801, so the noise is borrowed from the cell 802 which is in the same row as all 801 but on the opposite side of the supercell.

After the applicable noise factor is found, the pixel's spot function position and applicable noise is then passed to the spot function equation, and the threshold value is assigned to the pixel:

$$\text{Threshold\_value}_{(x,y)} = 50\% - 25\% * (\cos(PI* (u + \text{noise}_U * (abs(abs(u) + abs(v) - 1))) + \cos(PI* (v + \text{noise}_V * (abs(abs(u) + abs(v) - 1))).$$

For pixel 803, the variables of the equation will equal:

x=Current_Pixel_X_Pos=1;
y=Current_Pixel_Y_Pos=25;
u=Current_Func_U_Pos=−1;
v=Current_Func_V_Pos=1;
$\text{noise}_U$=Noise_U$_{(cell\ 802)}$=−0.062;
$\text{noise}_V$=Noise_V$_{(cell\ 802)}$=+0.123;

Under the above parameters, the threshold value of pixel$_{(1, 25)}$ 903 is about 97%.

4. Increment Position Indicators

Figures 18D, 18E, 18F:
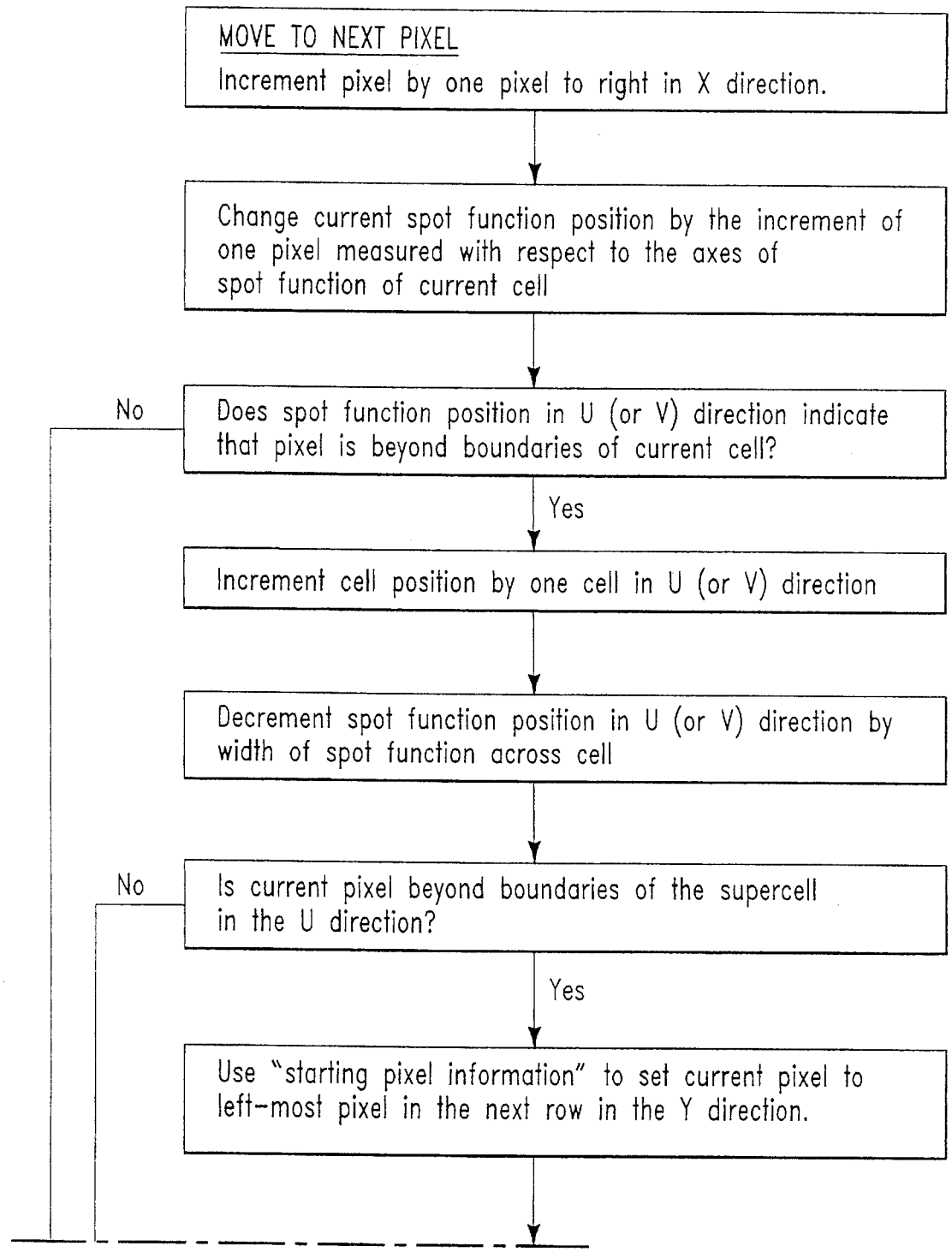

After the threshold value has been assigned to the current pixel, the next pixel is evaluated. All the pixels in any given row of the supercell are assigned threshold values before the pixels in the next row are assigned threshold values. The next pixel is evaluated after the typesetter, cell, and spot function position indicators are incremented to point to the next pixel. One preferred method of incrementing the position indicators is shown in 18(e) and 18(f), the correct alignment of these two figures being shown in FIG. 18(d).

To move one pixel to the right, the current pixel position in the X direction is incremented by one, i.e., Current_Pixel_X_Pos will equal Current_Pixel_X_Pos+1.

Next, the spot function position is incremented. The increment is a function of the size of the supercell in pixels, the number of cells in the supercell, and the angle of the supercell. The change of the spot function position in the U direction by moving one pixel in the X direction may be geometrically determined to be equal to:

$$\frac{2 * \text{Total\_Cells\_In\_Row} * \text{Run}}{\text{Run}^2 + \text{Rise}^2}$$

This value, which remains constant over the entire supercell, shall be referred to hereinafter as the "U_Pixel_Increment". The change in the spot function position in the V direction may also be determined by geometry to be equal to:

$$\frac{-2 * \text{Total\_Cells\_In\_Row} * \text{Rise}}{\text{Run}^2 + \text{Rise}^2}$$

This value shall be referred to hereinafter as the "V_Pixel_Increment".

By way of illustration, it is assumed that the threshold value of pixel 903 has been determined, and it is necessary to determine the threshold value of the next pixel 904. First, Current_Pixel_X_Pos is incremented by one so that Current_Pixel_X_Pos=2. Current_Pixel_Y_Pos will remain at its current value of 25.

Next, the spot function position is updated. For the supercell of FIG. 11, U_Pixel_Increment=( 2*2*25)/(25²+ 4²)=0.1560 and V_Pixel Increment=(−2*2*4)/(25²+4²)=− 0.0249. The spot function position is incremented thusly, such that Current_Func_U_Pos=−1+0.1560=−0.8440 and Current_Func_V_Pos=1+−0.0249=0.9751.

Once the spot function position is incremented, it is relatively easy to determine whether the current pixel is within the same cell or a new cell. Because the range of spot function position in the U and V direction is between −1 and 1 at the edges of the cell, any spot function position value less than −1 or greater than 1 will indicate that the pixel is beyond the edges of the current cell and within a neighboring cell. For example, if Current_Func_U_Pos>1, then the cell position indicators will be updated to reflect that the pixel is within the neighboring cell in the positive U direction of the current cell. If Current_Func_V_Pos<−1, then the cell position indicators will be updated to reflect that the pixel is within the neighboring cell in the negative V direction of the current cell. The polarity of the U and V directions of the next cell are known to be positive and negative, respectively, because it is assumed that the angle of the supercell is between 0° and 90°.

By way of illustration, it is determined that pixel 904 is in the same cell as pixel 903 because Current_Func_U_Pos= −0.8440 and is less than one, and because Current_Func_V_Pos=0.9751 and is greater than minus one. Therefore, the cell position indicators do not have to be updated. Once the position indicators for pixel 904 have been properly updated, the threshold value of pixel 904 can be determined.

If the new pixel is in a new cell to the right of the current cell, then the spot function position of the pixel must be updated. Because the spot functions have periods which correspond with the width and height of the cell, the new spot function position in the U direction will simply be the previous spot function position in the U direction minus the period of the spot function, i.e., 2 sf-units. Further, because the axes of the spot functions are continuous over all the cells, the spot functions' position in the V direction will be the same as in the previous cell.

Likewise, if the new pixel is in the cell below the previous cell, then the spot function position must also be updated. The new spot function position in the V direction will be the previous spot function position in the V direction plus 2 sf-units.

By way of illustration, the pixel position indicators will eventually point to pixel 905 which is on the edge of the current cell 801. After the threshold value of pixel 905 has been determined, it is necessary to increment the position indicators by one pixel in the positive X direction. The position indicators of pixel 905 are Current_Pixel_X_Pos=13, Current_Pixel_Y_Pos=25, Current_Func_U_Pos is about 0.8720, Current_Func_V_Pos is about 0.7005, Current_Cell_U_Pos=1, and Current_Cell_V_Pos=1. To point to pixel 906, Current_Pixel_X_Pos is incremented by one to 14. Next, Current_Func_U_Pos is incremented by U_Pixel_Increment such that Current_Func_U_Pos=0.8720+0.1560=1.0280, and Current_Func_V_Pos will be incremented by V_Pixel_Increment such that Current_Func_V_Pos=0.7005−0.0249=0.6756. Because Current_Func_U_Pos=1.0280 and is greater than one, the cell position indicator in the U direction must be incremented by one cell. Therefore, Current_Cell_U_Pos=1+1=2. The new cell position indicator is (2,1) or cell 802. Current_Func_U_Pos is updated by subtracting 2, such that Current_Func_U_Pos=1.0280−2=−0.9720. The Current_Func_V_Pos will remain 0.6756. Now that all the position indicators for pixel 906 are updated, the threshold value for pixel 906 can be evaluated.

For pixels at the far right boundary of the supercell, incrementing the position indicators one pixel to the right will take the current pixel outside of the supercell. One way to test whether the current pixel was incremented out of the supercell is to update the cell position indicators as discussed above, and then determine whether those indicators point to a cell which does not exist. For example, if Current_Cell_U_Pos is incremented to a value which is greater than Total_Cells_In_Row, then the current pixel position indicators must point to a pixel which is beyond the boundaries of the supercell. If so, then the current row of pixels is finished, and a new row will be started.

When a new row is started, the pixel position is updated by retrieving the starting pixel information, i.e., all the position information which was associated with the first pixel 903 in the previous row. All the position indicators are then incremented one pixel in the negative Y direction. If the new spot function position indicates that moving one row down from starting pixel 903 is beyond the left boundary of the supercell, as might be the case because of the rotation of the supercell, then the pixel position indicators are incremented by one pixel in the X direction until a pixel is found which is within the supercell. Likewise, if the new pixel is in a new cell, then the cell and spot function position indicators are incremented accordingly.

By way of illustration, the Y=25 row of pixels will be completed when the threshold value of pixel 907 has been evaluated. When the typesetter and spot function positions are incremented from pixel 907 to pixel 908, Current_Func_U_Pos will be greater than one, and the spot function position will indicate that pixel 908 is not in the cell designated by Current_Cell_U_Pos and Current_Cell_V_Pos. Accordingly, the cell position indicators are updated. However, the cell position indicators will point to a cell which does not exist. Current_Cell_U_Pos will equal 3 when the total cells in a row of the supercell is only 2. Therefore, since Current_Cell_U_Pos>Total_Cells_In_Row, it is known that pixel 907 was the last pixel in the row of pixels to be evaluated.

Therefore, the starting pixel position information for starting pixel 903 in row Y=25 is retrieved and incremented by one pixel in the negative Y direction to start the next row. Since pixel 903 had a typesetter position of (1,25), a spot function position of (−1,1) and a cell position of (1,1), all of these positions are modified by one pixel in the negative Y direction to correspond with the starting pixel 909 in the next row. Therefore, for pixel 909, Current_Pixel_X_Pos remains equal to 1 and Current_Pixel_Y_Pos is set equal to 24.

The spot function position is modified to reflect the movement of one pixel in the negative Y direction. This relative movement is equal to the vector defined by U_Pixel_Increment and V_Pixel_Increment, but at a 90° angle to that vector because movement is in the Y direction, not the X direction. Therefore, U_Pixel_Increment and V_Pixel_Increment may be used to modify the spot function position, but to account for the 90° change, the magnitude of the V direction increment is subtracted from the U direction spot function position, and the magnitude of the U direction increment is subtracted from the V direction spot function position. In other words, to modify the spot function position by one pixel in the negative Y direction, abs(V_Pixel_Increment) is subtracted from Current_Func_U_Pos and abs(U_Pixel_Increment) is subtracted from Current_Func_V_Pos. Therefore, for pixel 909, Current_Func_U_Pos−abs(V_Pixel_Increment)=−1−0.0249=−1.0249 and Current_Func_V_Pos=Current_Func_V_Pos−abs(U_Pixel_Increment)=1−0.1560=0.8440. Because Current_Cell_U_Pos<−1, pixel 909 must be outside of the supercell. Therefore, the position indicators are modified by one pixel in the X direction until a pixel is found in the supercell. When a pixel in the supercell is found, such as pixel 910, the starting pixel information is set to the current position indicators of pixel 910. The rest of the row Y=24 is then evaluated in the manner described above. When the row Y=24 now is finished, the starting pixel information is retrieved again to determine the position information for the first pixel of row Y=23.

Towards the bottom of the supercell, the rows of pixels do not extend across the entire width of the supercell. Instead, due to the angle of supercell, the bottom rows terminate at the bottom boundary of the supercell. When a pixel position indicator is incremented below the supercell, the row below the next row is not begun. Instead, the pixel position indicators "wrap up" to the corresponding pixel in the top rows of the supercell, and the process continues as above until the end of the row is reached. After the pixels in the top row are evaluated, the pixel position indicators are restored in the usual way to the first pixel in the bottom rows. This process continues until all the pixels of the supercell are evaluated.

By way of illustration, the pixel position indicators will eventually point to pixel 921. When the pixel position indicators are incremented by one pixel to the right to point to pixel 922, the cell and spot function position will indicate that the pixel 922 is below the boundaries of the supercell. Since pixel 922 is beyond boundary 873, the position indicators are modified to point to pixel 901 in the top row of the supercell. Pixel's 901 spot function position is easily determined as it will be the same spot function position as if pixel 922 were validly in a cell of the supercell. Therefore, Current_Func_V_Pos is incremented by adding the height of the spot function, i.e., 2 sf-units. The cell position indicators are set to reflect the cell in the same column but in the topmost row of the supercell. Current_Pixel_Y_Pos is incremented by 25 (the Run) and Current_Pixel_X_Pos is decremented by 4 (the Rise).

When the last pixel in the supercell has been evaluated, the process is complete.

5. Scaling of Threshold Values

After every pixel of the supercell has had its value stored, it is advantageous to convert these values to threshold values scaled to correspond with the contone data which will be screened. For example, it is common for contone data to be represented by 8-bit unsigned values which describe up to 256 distinct gray levels. Consequently, generating unsigned 8-bit threshold values allows the screening to take place by direct comparison of a contone data value and a corresponding threshold value. It is also advantageous to distribute threshold values as evenly as possible over the full range of values.

In order to assign the threshold values, the cells are considered to be in the rectangular shape as designated by lines 880 of FIG. 11. The precise set of pixels corresponding to each such rectangle in the supercell is determined by considering the position of each pixel relative to the diagonal lines joining the midpoints of the boundaries of the cells in the same manner described previously to determine the spot function position of each pixel. Each such rectangle will contain an integer number of pixels and in general the number of pixels per rectangle will differ.

The pixel with the lowest calculated value in "rectangular cell" 880 is assigned a threshold of 1. This would be a pixel which corresponds with the white center of rectangular cell 880. The ideal threshold is then increased by the number of pixels in the rectangle divided by 256, which is usually not an integer. The pixel in rectangular cell 880 with the next lowest value is assigned a threshold value equal to the closest integer to the ideal threshold. The ideal threshold is then increased again. The process continues until the pixel with the largest value is assigned a new threshold value which is approximately equal to 255.

This process is repeated for each rectangular cell in the supercell. When finished, every pixel in the supercell will have an integer threshold value which is between 1 and 256.

CONTROLLING SPOT GROWTH

A. Rates of Growth

When gray scale values are allocated to the pixels on the basis of their threshold values, it is advantageous to assign gray values in a controlled manner. Therefore, rather than simply scaling the threshold value of the pixel and assigning it the nearest integer as its gray scale value, an alternative manner of gray value assignment is preferable.

Assuming that there will be G different gray values, the average number of pixels added to a spot at each successive gray value is $(n^2/G)$, where $n^2$ is the average number of pixels per spot within a supercell (assuming the average cell is n×n pixels). Neither n nor G is necessarily an integer.

In order to prevent the creation of Moire patterns due to endtone spot growth, the present invention grows all the spots at the same rate at the endtones, and at a potentially different rate at the midtones.

Preferably, a growth rate of $(n^2/G)$ pixels per gray value increment is used at the endtones for all spots within the supercell. Since $(n^2/G)$ is generally not an integer, it is approximated by adding the integer portion of $(n^2/G)$ or the integer portion of $(n^2/G)$ plus one pixel, i.e., int$(n^2/G)$ or int$(n^2/G)$+1. The rate at which pixels are added to a spot near the endtones is hereinafter referred to as "the endtone growth rate". For example, if G=128 and n=12.5, then for each unit increase in gray value, the number of pixels added to a spot will be $(12.5^2)/128$, or about 1.22 pixels. If the gray value=1, then the number of pixels added will equal int(0*1.22)=0, i.e., no pixels added. If gray value=1, then the number of pixels in the spot will equal int(1*1.22)=one pixel. If the gray value=2, then the number of pixels in the spot will equal int(2*1.22)=two pixels. Likewise, for gray value=4, the spot will include 4 pixels. However, if gray value=5, then two pixels will be added for the single increment in gray value from 4 to 5. The reason is because int( 5*122)=6 pixels. Therefore, whereas single increments in gray value increased the spot by a single pixel until gray value=4, a gray value of 5 increases the spot by two pixels.

At the midtones, on the other hand, the growth rate is individually adjusted as appropriate for each cell depending on its size. The growth rate for the midtones ("the midtone growth rate") could change from the endtone growth rate at a single point, at multiple points, or even continuously.

Preferably, the midtone growth rate is $2*(n^2/G)$, i.e., twice the endtone rate, for cells that have more than $n^2$ pixels and is zero otherwise.

The transition point from the endtone growth rate to the midtone growth rate is preferably variable depending on the total number of pixels in the cell. Specifically, the transition point between 0% and 50% gray value is:

If $N_i^2 >= n^2$, then endtone growth rate=$(n^2/G)$ midtone growth rate=$2*(n^2/G)$ with the transition from endtone growth rate to midtone growth rate occurring after
$n^2-(N_i^2)/2$ pixels have been added;

If $N_i^2 < n^2$, then endtone growth rate=$(n^2/G)$ midtone growth rate=0 with the transition from endtone growth rate to midtone growth rate occurring after
$(N_i^2)/2$ pixels have been added;

where $N_i^2$=number of pixels in cell i;

$n^2$=average number of pixels per cell for all cells in supercell; and

G=total number of gray values.

Figure 14:
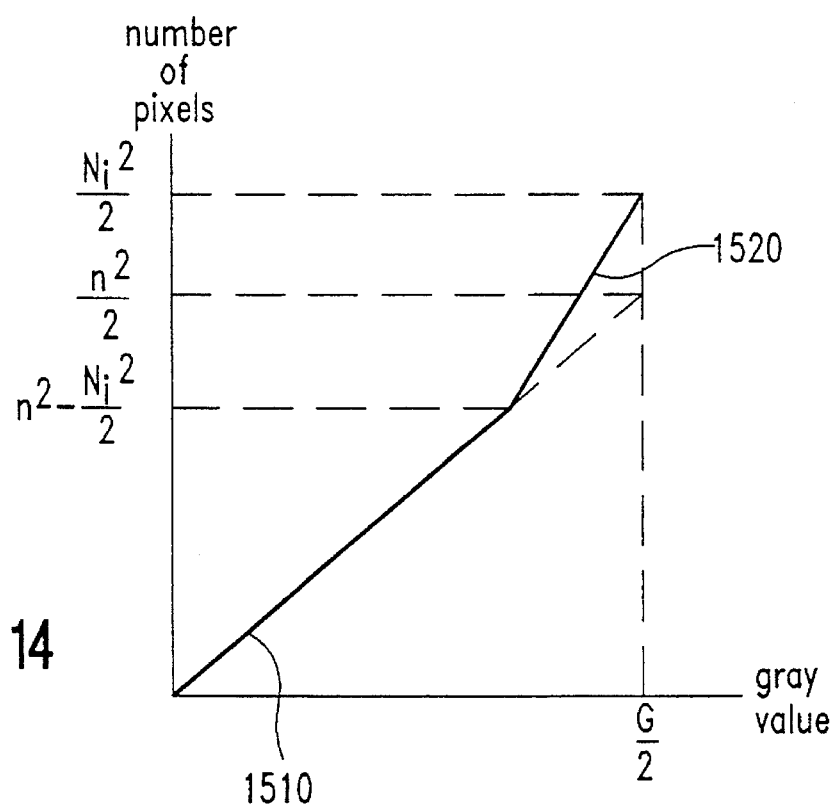
FIG. 14 is a graph of spot growth in accordance with another aspect of the present invention.
Figure 15:
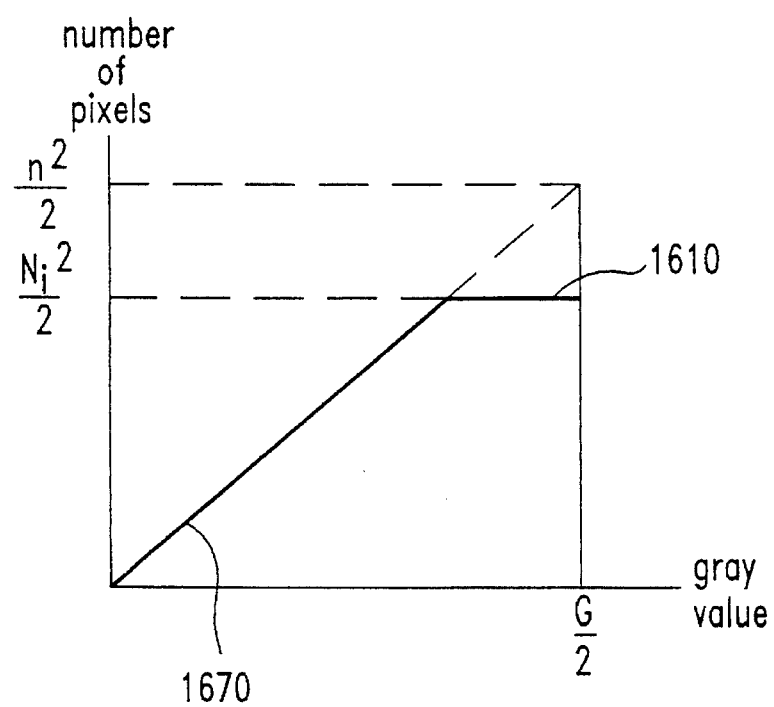
FIG. 15 is a graph of spot growth in accordance with another aspect of the present invention.

The relative growth rates for both cases are shown in FIGS. 14 and 15. FIG. 14 represents the case where $N_i^2 \geq n^2$, i.e., when the number of pixels in the individual cell is greater than the average number of pixels per cell. As shown by line 1510, the spot grows at the rate of $(n^2/G)$ pixels/gray value at or near the endtones. In other words, near the endtones, the spot grows at a linear rate which would exactly fill all the pixels in an average cell at the maximum gray value of G, the darkest gray value. However, since the individual cell$_i$ has more pixels than the average cell, cell$_i$ must eventually be filled at a faster rate than the average cell would be. Therefore, once $n^2-(N_i^2)/2$ pixels have been added to the spot, the spot growth rate doubles to $2*(n^2/G)$ to make up for the extra pixels in cell$_i$, as shown by line 1520.

FIG. 15 represents the case where $N_i^2 < n^2$, i.e., when the number of pixels in the individual cell is less than or equal to the average number of pixels per cell. As shown by line 1610, the spot grows at the rate of $(n^2/G)$ pixels/gray value at or near the endtones, which is the same rate of growth shown in FIG. 14 where the individual cell was larger than the average cell. Thus, just like the spot of FIG. 14, the spot 45 initially grows at a linear rate which would exactly darken all the pixels in an average cell at the maximum gray value of G, the darkest gray value. However, since the individual cell i has less pixels than the average cell, cell i must be eventually be darkened at a slower rate than the average cell. Therefore, once $(N_i^2)/2$ pixels have been added to the spot, no more pixels are added to the cell at the midtones.

By having the transition point dependant on the individual cell size, a uniform growth rate is maintained for as much of the tone level as possible, and the results of growth appear to look similar for wide ranges of values of n.

Although FIG. 14 and 15 show only the spot growth rates for gray values between 0% and 50%, the growth rates above 50% gray are symmetrical to the growth rates below 50%. At the endtones near 100% gray, the endtone growth rate is equal to $(n^2/G)$, whether the individual cell has more or less pixels than the average cell. However, for gray values closer to 50%, no pixels are added when the cell has less pixels than the average cell, and $2*(n^2/G)$ pixels per gray value increment are added when the cell has more pixels than the average cell. The transition points for gray value between 50% and 100% are symmetrical to the transition points for gray values between 0% and 50%:

If $N_i^2 >= n^2$, then endtone growth rate=$(n^2/G)$ midtone growth rate=$2*(n^2/G)$ with the transition from midtone growth rate to endtone growth rate occurring after
$3*(N_i^2)/2-n^2$ pixels have been added;

If $N_i^2 < n^2$, then endtone growth rate=$(n^2/G)$ midtone growth rate=0 with the transition from midtone growth rate to endtone growth rate occurring after
$n^2-(N_i^2)/2$ pixels have been added.

Thus, at the endtones, the spot growth rate is always $(n^2/G)$ no matter what the size of the individual cell may be. At the midtones, however, the growth rate is twice $(n^2/G)$ for cells which are larger than average and zero for cells which are smaller than average.

B. Procedure for Allocating Gray Value Values

In operation, the method of effecting spot growth preferably uses the data generated by the invention pertaining to endtone noise discussed above.

As mentioned above, all the threshold values of the pixels in the supercell are stored. Next, sets of data are created, with each set of data including information about the pixels in a single rectangular cell, like that of cell 880 in FIG. 11. This data, referred to hereinafter as Cell_Data$_i$ where i is the identification number of a cell, includes the typesetter location (x,y) of all the pixels in cell i, along with the floating point threshold value for each pixel. In addition, the pixel information in Cell_Data$_i$ is sorted by increasing threshold value. For example, for illustration purposes only, the data structure derived for cell 880 Cell_Data$_{880}$ might look as follows:

| Cell_Data$_{880}$ | |
|---|---|
| Pixel location (x,y) | Threshold Value |
| 10,8 | 0.3% |
| 10,9 | 0.4% |
| 11,8 | 0.4% |
| 11,9 | 0.6% |
| 11,10 | 1.0% |
| 12,9 | 1.2% |
| ... | |
| 16,16 | 88.9% |
| 16,15 | 99.0% |
| 15,15 | 99.7% |
| 15,16 | 99.8% |

These threshold values are then changed to correspond with integer-gray value increments. If the total possible number of gray values is 256 (G=256), then each pixel will have its threshold value changed to correspond with a number between 0 and 255, with 0 being the lightest tone (no pixels darkened) and 255 being the darkest tone (all pixels darkened).

One manner of thusly converting the threshold values into integers between 1 and G–1 also modifies the threshold values so that the spot growth of the present invention is incorporated at the same time.

Figure 16:
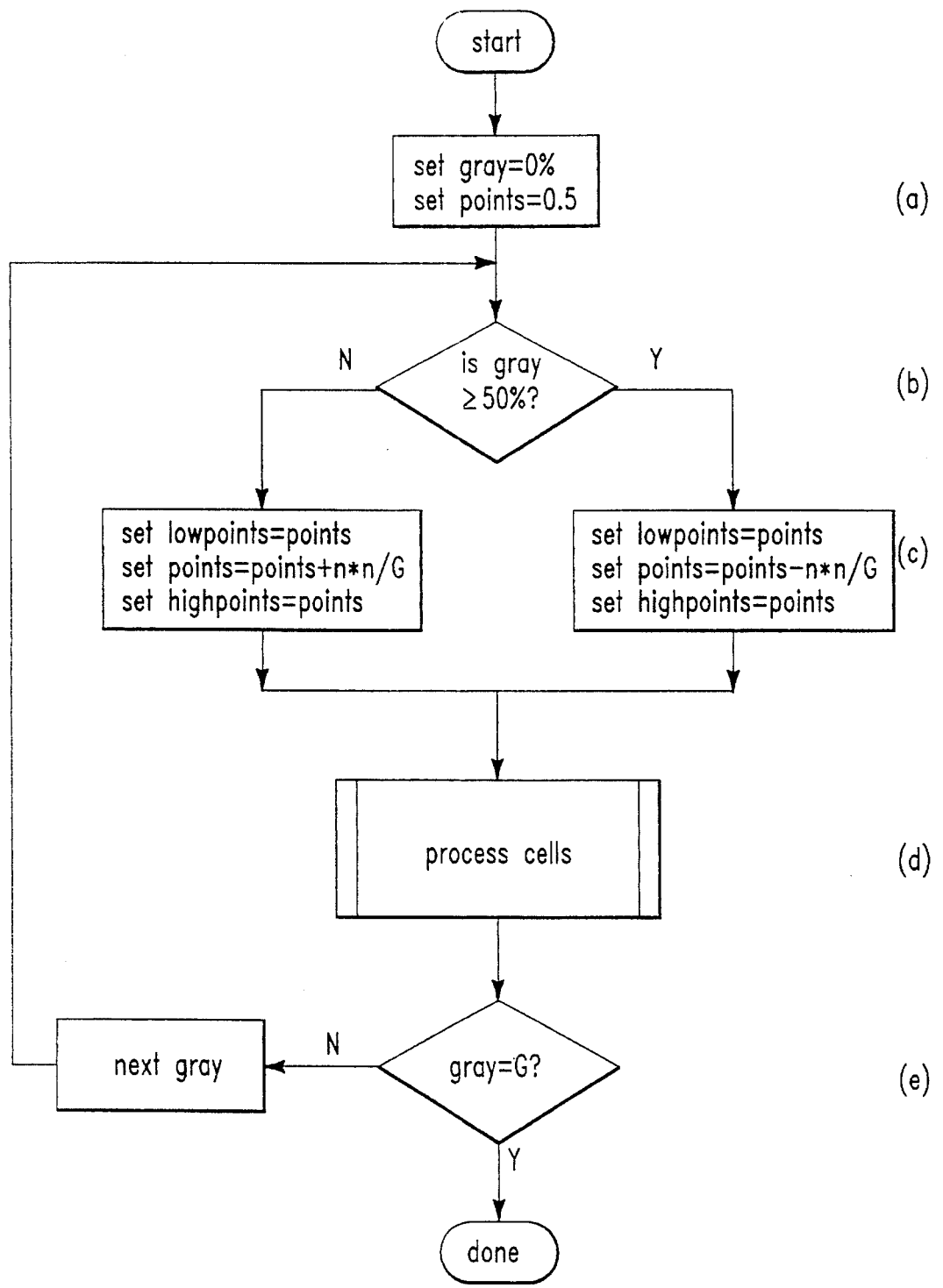
FIG. 16 is a flow chart of one aspect of the present invention.

As shown in step (a) in FIG. 16, the method starts with the lowest possible gray value 0, such that gray=0%. Next, another variable points is set to 0.5. The variable points is a floating-point variable which represents the number of pixels which should be darkened at any particular gray value. In other words, the "number of pixels" axes of FIGS. 14 and 15 could be renamed "points".

Next, it is determined in step (b) in FIG. 16 whether gray is greater than or equal to 50% gray. Afterwards, through step (c) two floating-point variables lowpoints and highpoints are set depending on the result of the 50% gray determination. Lowpoints and highpoints are two points on the growth rate function reflecting the number of pixels v. gray value (FIGS. 14 and 15), and represent the lower and upper bounds of the number of pixels for a particular gray level. Specifically, if gray is less than 50% gray, lowpoints is set to the lowest number of possible pixels for the gray level. Highpoints is set to the highest number of possible pixels for the gray level, which is ideally equal to the number of pixels per interval gray value for an average cell plus lowpoints, i.e., lowpoints+$(n^2/G)$. In other words, for every gray level gray, lowpoints represents the total number of pixels darkened for gray levels lower than gray, and highpoints represents the number of pixels which are darkened for a gray level equal to gray. Initially, as shown in step (c) in FIG. 16, the lowpoints and highpoints are set as if they are two points on the ideal slope lines 1510 and 1670 shown in FIGS. 14 and 15, respectively. Thus, highpoints is $(n^2/G)$ greater than lowpoints. For each increment in gray level (gray), lowpoints and highpoints are increased until gray is equal to or greater than 50%.

If gray is greater than or equal to 50%, lowpoints and highpoints start decreasing at the same rate which lowpoints and highpoints increased when gray was less than 50%. Thus, the growth rate, set by step (c) in FIG. 16, above 50% gray will be symmetrical with the growth rate below 50% gray.

Figure 17:
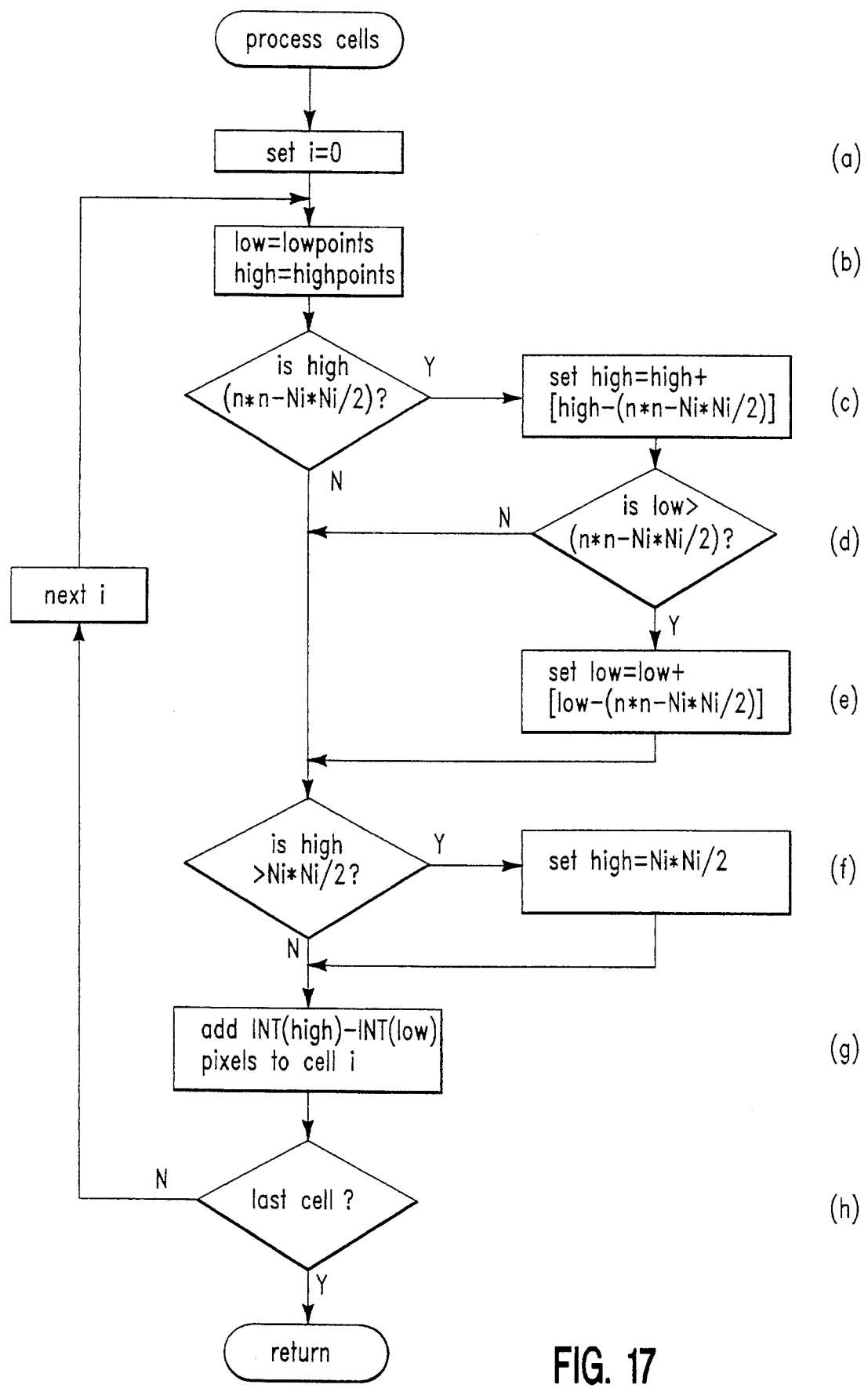
FIG. 17 is a flow chart of a further aspect of the present invention.

Next, with the ideal lowpoints and highpoints set, all individual cells are processed at the gray level gray, as shown in more detail in FIG. 17.

First, in step (a), an indexing variable i is set to point to the first of the cells in the supercell. Next, in step (b) variables low and high are set equal to lowpoints and highpoints. Because lowpoints and highpoints are "ideal" variables for all the cells, low and high are used to determine the "actual" lowpoints and highpoints for each individual cell for the particular gray level.

Next, in step (c), it is determined if high is greater than the transition point required to move from the endtone growth rate to the midtone growth rate. If high>$(n^2-N_i^2/2)$, then high should be a point on the steeper midtone growth rate (line 1520 in FIG. 14) rather than on the endtone growth rate (line 1510 in FIG. 15). Accordingly, if high is beyond the transition point, high is reset to high+[high–$(n^2-N_i^2/2)$], which is a point on line 1520 which corresponds with the midtone growth rate. Likewise, if low is greater than the same transition point, low is also reset to a point on the midtone growth-rate line 1520. See steps (d) and (e) in FIG. 17.

After low and high are adjusted to correspond with the correct growth rate, through step (f) in FIG. 17, high is tested to see if it is greater than the half the total number of pixels in the cell. If so, high is reset to equal to $N_i^2/2$. Thus, high is never greater than half the actual number of pixels in the cell. Holding high at $N_i^2/2$ prevents pixels from being added once high reaches the threshold point of $N_i^2/2$. Thus step (f) creates the flat slope line 1610 of FIG. 15, such that cells having less than the average number of pixels do not add pixels to the cell in the midtones once half the pixels in the cell have already been added.

Finally, through step (g) in FIG. 17, the number of pixels to be added to the cell for gray level gray is determined by subtracting the integer value of high from the integer value of low. Thus, int(high)–int(low) pixels are removed from the end of sorted linked-list Cell_Data and assigned the integer value of gray. For example, if gray=0% and int(high)–int(low)=2 for cell 880, the first two pixels (10,8) and (10,9) will be removed from Cell_Data$_{880}$, and their threshold values are changed from 0.3% and 0.4% to simply the integer zero. Similarly, if gray =1% and int(high)–int(low)= 3, the next three pixels (11,8), (11,9) and (11,10) will be removed from Cell_Data$_{880}$, and their threshold values are changed from 0.4%, 0.6% and 1.0% to the integer 1.

After cell i has been evaluated, the next cell is evaluated by resetting low and high to the ideal values of lowpoints and highpoints, and then adjusting low and high depending on the size of the cell. The process continues until all the cells at gray level gray are evaluated. The entire process is repeated until all the gray levels are evaluated, i.e., once gray=G.

In this manner, the threshold values of the pixels are changed from floating point numbers to integer gray level increments, and the growth of the spot is controlled.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

We claim:

1. In typesetting apparatus for generating, through a marking engine, a raster-based printed writing pattern, formed of successive rows of binary writing spots, that visually depicts a continuous-tone image, wherein said continuous-tone image is formed of a plurality of multi-bit continuous-tone pixels organized in raster fashion and each of the writing spots is represented by a corresponding single-bit pixel such that all single-bit pixels collectively form a printed halftone image, a method for generating the writing spots from said continuous-tone image so as to reduce Moire patterns in the binary image comprising the steps of:

defining, for all continuous-tone pixel values stored in a memory and originating with an input signal and collectively representing the continuous-tone image, a plurality of successive non-overlapping halftone cells, wherein each of the halftone cells is a corresponding substantially rectilinear portion of the binary image and has associated therewith a continuous-tone value of a spatially corresponding one of the continuous-tone pixels;

establishing, for each of the cells and in response to a common stored matrix of pre-defined threshold values, a spot function collectively formed of a corresponding stored matrix of varied threshold values, the establishing step comprising:

generating a randomly varying noise value for each different pixel location within said each cell and which also varies between successive ones of the cells; and selecting, for each different one of the pixel locations within said each cell, a corresponding one of the pre-defined threshold values from the stored matrix thereof wherein the one pre-defined threshold value is selected as a pre-determined function of both said each pixel location and the noise value associated therewith so as to form a corresponding one of the varied threshold values in the matrix thereof, such that ones of the varied threshold values in the matrix thereof and associated with end-tones of said each cell will exhibit randomly differing values within and across successive ones of the cells but remaining ones of the varied threshold values in the matrix thereof and associated with mid-tones of said each cell will exhibit substantially no random variation across said successive ones of the cells, whereby each of said cells has a different spot function associated therewith; and generating, for each of the cells, corresponding ones of the writing spots in the binary image in response to whether the corresponding one continuous-tone value for said each cell is greater than or less than one of the varied threshold values in the spot function associated with each of said writing spots in the cell, so as to form the printed halftone image.

2. The method of claim 1 wherein the selecting step selects the corresponding ones of the pre-defined threshold values, associated with the end-tones and situated remotely from a mid-tone locus in said common stored matrix, to have an increased random variation over the remaining ones of the pre-defined threshold values associated with mid-tones and situated in a vicinity of the mid-tone locus in said common stored matrix.

3. The method of claim 1 wherein the spot function of each of the cells provides mid-tone values for pixel locations along a mid-tone locus in the form of a substantially closed loop surrounding a central region of said each cell so that said each cell has corner regions outside of said loop and the corner regions of adjacent ones of the cells border one another, and wherein said selecting step selects ones of the pre-defined threshold values, for pixel locations within mutually bordering ones of the corner regions of the adjacent cells, to be substantially continuous with one another.

4. The method of claim 3 wherein the spot function has, as arguments thereof, pixel location within any one cell and at least one noise component, the noise component being a function of at least one noise value within the one cell, wherein the noise value is a common random value for pixel locations situated within the central region of each cell but is a different random value for the central regions of different cells, and said noise value is a common random value for pixel locations situated throughout each set of mutually bordering corner regions but is a different random value for different sets of said corner regions.

5. The method of claim 4 wherein the pre-defined function is given, in two-dimensions, by the following expression:

$$f[u+noise_u*(abs(abs(u)+abs(v)-1)), v+noise_v*(abs(abs(u)+abs(v)-1))]$$

where:

u and v represent a pixel location within said each cell and are scaled such that $-1 \leq u \leq 1$ and $-1 \leq v \leq 1$;

$noise_u$ and $noise_v$ are noise components along u and v axes, respectively, within said each cell; and f[] represents a function.

6. The method of claim 5 wherein $f[u,v]=\cos u+\cos v$ such that the varied threshold value for each pixel location in said each cell is proportional to the expression:

$$\cos (u+noise_u*(abs(abs(u)+abs(v)-1)))+\cos (v+noise_v*(abs(abs(u)+abs(v)-1))).$$

7. The method of claim 4 wherein a mid-tone loci of said cells intersect one another at borders between cells so that said intersecting mid-tone loci separate sets of mutually bordering corner regions from one another.

8. The method of claim 3 wherein the spot function is responsive to pixel location within said each cell and at least one noise component, the noise component being a function of at least one noise value, said noise value being different for a majority of said cells, wherein said noise value has a noise magnitude which corresponds with a distance between a first pixel location, within said each cell and having a corresponding threshold value closest to a first minimum one of the pre-defined threshold values in the spot function for said each cell, and a second pixel location, within said each cell and having a threshold value closest to a second minimum one of the varied threshold values for said each cell.

9. The method of claim 8 wherein said spot function is also responsive to a noise direction, said noise direction being defined by a direction of a line extending in said each cell from the first to the second pixel locations.

10. The method of claim 9 wherein the first pixel location is an origin location of said each cell, the second pixel location is a center location of the spot function, said center location being a pixel location in the cell at which the spot function is zero, and wherein ones of the varied threshold values, associated with pixel locations in said each cell away from said center location and along the noise direction, are less than spatially corresponding ones of the pre-defined threshold values.

11. The method in claim 10 wherein ones of the varied threshold values, associated with pixel locations in said each cell away from the center location and along a direction opposite to the noise direction, are greater than spatially corresponding ones of the pre-defined threshold values.

12. The method in claim 1 further comprising the step of scaling each of said varied threshold values to an integer continuous-tone level closest to said each varied threshold value.

13. The method in claim 1 further comprising:

providing an input picture signal having signal values associated with different corresponding pixel locations in an input picture; and printing a corresponding one of the writing spots at a pixel location if the magnitude of the input signal associated with any one of the pixel locations is greater than a corresponding one of the varied threshold values associated with said any pixel location.

14. In typesetting apparatus for generating, through a marking engine, a raster-based printed writing pattern, formed of successive rows of binary writing spots, that visually depicts a continuous-tone image, wherein said continuous-tone image is formed of a plurality of multi-bit continuous-tone pixels organized in raster fashion and each of the writing spots is represented by a corresponding single-bit pixel such that all single-bit pixels collectively form a printed halftone image, a method for generating the writing spots from said continuous-tone image so as to reduce Moire patterns in the binary image comprising the steps of:

defining, for all continuous-tone pixel values stored in a memory and originating with an input signal and collectively representing the continuous-tone image, a plurality of successive non-overlapping halftone cells, wherein each of the halftone cells is a substantially rectilinear portion of the binary image and has associated therewith a continuous-tone value of a spatially corresponding one of the continuous-tone pixels;

establishing, for each of the cells and in response to a common stored matrix of pre-defined threshold values, a spot function collectively formed of a corresponding stored matrix of varied threshold values, the establishing step comprising:

generating a randomly varying noise value for each different pixel location within said each cell and which also varies between successive ones of the cells; and selecting, for each different one of the pixel locations within said each cell, a corresponding one of the pre-defined threshold values from the stored matrix thereof wherein the one pre-defined threshold value is selected as a pre-determined function of both said each pixel location and the noise value associated therewith so as to form a corresponding one of the varied threshold values in the matrix thereof, such that ones of the varied threshold values in the matrix thereof and associated with end-tones of said each cell will exhibit randomly differing values within and across successive ones of the cells but remaining ones of the varied threshold values in the matrix thereof and associated with mid-tones of said each cell will exhibit substantially no random variation across said successive ones of the cells, whereby each of said cells has a different spot function associated therewith;

generating, for each of the cells, corresponding ones of the writing spots in the binary image in response to whether the corresponding one continuous-tone value for said each cell is greater than or less than one of the varied threshold values in the spot function associated with each of said writing spots in the cell, so as to form the printed halftone image; and wherein the pre-defined function is given, in two-dimensions, by the following expression:

$$f[u+noise_u*(abs(abs(u)+abs(v)-1)), v+noise_v*(abs(abs(u)+abs(v)-1))]$$

where:

u and v represent a pixel location within said each cell and are scaled such that $-1 \leq u \leq 1$ and $-1 \leq v \leq 1$;

$noise_u$ and $noise_v$ are noise components along u and v axes, respectively, within said each cell; and f[] represents a function.

15. The method of claim 14 wherein f[u,v]=cos u+cos v such that the varied threshold value for each pixel location in said each cell is proportional to the expression:

$$\cos(u+noise_u*(abs(abs(u)+abs(v)-1)))+\cos(v+noise_v*(abs(abs(u)+abs(v)-1))).$$

16. In typesetting apparatus for generating, through a marking engine, a raster-based printed writing pattern, formed of successive rows of binary writing spots, that visually depicts a continuous-tone image, wherein said continuous-tone image is formed of a plurality of multi-bit continuous-tone pixels organized in raster fashion and each of the writing spots is represented by a corresponding single-bit pixel such that all single-bit pixels collectively form a printed halftone image, a method for generating the writing spots from said continuous-tone image so as to reduce Moire patterns in the binary image comprising the steps of:

defining, for all continuous-tone pixel values stored in a memory and originating with an input signal and collectively representing the continuous-tone image, a plurality of successive non-overlapping halftone cells, wherein each of the halftone cells is a substantially rectilinear portion of the binary image, each of the cells having a two-dimensional integral size though with a plurality of said cells having differing numbers of binary pixels therein and said each cell has associated therewith a continuous-tone value of a spatially corresponding one of the continuous tone pixels;

establishing, for each of the cells and in response to a stored matrix of pre-defined threshold values, a spot function collectively formed of a corresponding stored matrix of varied threshold values, the establishing step comprising:

ascertaining a growth variation for ones of the pre-defined threshold values associated with mid-tones in said each cell, the growth variation also varying for the same mid-tone across different cells and the continuous-tone pixel value for said each cell lying between pre-defined minimum and pre-defined maximum gray scale values; and producing, for each different one of the pixel locations within said each cell, a corresponding one of the varied thresholds wherein each of said varied thresholds for the mid-tones is a corresponding one of the pre-defined thresholds modified by the growth variation such that, for a given increase in the continuous-tone value at the mid-tones or end-tones, an increase in a number of binary pixels to be written in said each cell at the mid-tones exceeds an increase in the number of pixels to be written at the end-tones, and the increase in the number of binary pixels written at the mid-tones varies across successive ones of the cells but the increase in the number of pixels to be written at the end-tones is substantially the same across said successive cells; and generating, for each of the cells, corresponding ones of the writing spots in the binary image in response to whether the corresponding one continuous-tone value for said each cell is greater than or less than one of the varied threshold values in the spot function associated with each of said writing spots in the cell, so as to form the printed halftone image.

17. The method of claim 16 wherein the increase in the number of pixels to be written at the mid-tones in any one of the cells, that contains a total number of binary pixels, P, that exceeds or equals a total number of binary pixels/cell, $P_{avg}$, averaged across all of the cells in the binary image, exceeds the number of pixels to be written at the mid-tones in any remaining one of the cells wherein $P < P_{avg}$ for said remaining one cell.

18. The method of claim 17 wherein the increase, $\Delta P_{end}$, in the binary pixels to be written in said each cell for the end-tones is $P_{avg}/G$, where G is a number of different continuous-tone values that can possibly occur in the continuous-tone image.

19. The method of claim 18 wherein the increase in binary pixels to be written in said each cell for the mid-tones, $\Delta P_{mid}$, is an integer multiple of $P_{avg}/G$.

20. The method of claim 19 wherein, for said each cell wherein $P \geq P_{avg}$, $\Delta P_{mid}$ is set to twice $\Delta P_{end}$ and for said each cell wherein $P < P_{avg}$, $\Delta P_{mid}$ is set to zero.

21. The method of claim 17 wherein the increases in the number of pixels to be written in said each cell changes at transition points within said each cell from $\Delta P_{end}$ to $\Delta P_{mid}$, and wherein the transition points depend upon the total number, P, of binary pixels that collectively form said each cell, wherein $\Delta P_{end}$ and $\Delta P_{mid}$ are the increases in the number of pixels to be written in said each cell for the end-tones and mid-tones, respectively.

22. The method of claim 21 wherein the transition points are given by: where $P \geq P_{avg}$, after either $(P_{avg}-(P/2))$ or $((3P/2)-P_{avg})$ binary pixels have been darkened; and where $P<P_{avg}$, after either $(P/2)$ or $(P_{avg}-(P/2))$ binary pixels have been darkened.

23. The method of claim 16 further comprising the steps of:

providing an input picture signal having said continuous-tone values representing the continuous-tone image; and darkening one of the binary pixels in said each cell whenever the varied threshold for the one binary pixel is less than the continuous-tone value of said input picture signal and associated with said each cell.

* * * * *